US012580493B2

(12) United States Patent
Wang et al.

(10) Patent No.: US 12,580,493 B2
(45) Date of Patent: Mar. 17, 2026

(54) NEUTRAL POINT CLAMPED INVERTER AND PHOTOVOLTAIC POWER SUPPLY SYSTEM

(71) Applicant: Huawei Digital Power Technologies Co., Ltd., Shenzhen (CN)

(72) Inventors: Xudong Wang, Shanghai (CN); Zhaohui Wang, Shenzhen (CN); Lei Shi, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 251 days.

(21) Appl. No.: 18/321,824

(22) Filed: May 23, 2023

(65) Prior Publication Data

US 2023/0299690 A1 Sep. 21, 2023

Related U.S. Application Data

(63) Continuation of application No. PCT/CN2021/094124, filed on May 17, 2021.

(30) Foreign Application Priority Data

Nov. 25, 2020 (CN) .......................... 202011341053.1

(51) Int. Cl.
  *H02M 7/487* (2007.01)
  *H02J 3/38* (2006.01)
(52) U.S. Cl.
  CPC ............. *H02M 7/487* (2013.01); *H02J 3/381* (2013.01); *H02J 2300/24* (2020.01)
(58) Field of Classification Search
  CPC .................................................. H02M 7/487
  See application file for complete search history.

(56) References Cited

U.S. PATENT DOCUMENTS 6,072,707 A * 6/2000 Hochgraf ............ H02M 7/5387
                                                     363/136
6,838,925 B1 * 1/2005 Nielsen ................. H02M 7/487
                                                     363/132
(Continued)

FOREIGN PATENT DOCUMENTS

CN       202818142 U    3/2013
CN       106655852 A    5/2017
(Continued)

OTHER PUBLICATIONS

Deshpande et al., "Practical Design Considerations for a Si IGBT+ SiC MOSFET Hybrid Switch: Parasitic Interconnect Influences, Cost and Current Ratio Optimization", IEEE Transactions on Power Electronics, IEEE, Jan. 2019, 13 pages.
(Continued)

*Primary Examiner* — Sisay G Tiku
(74) *Attorney, Agent, or Firm* — Maier & Maier, PLLC

(57) ABSTRACT

A neutral point clamped inverter and a photovoltaic power supply system include a power module, a switch module, and a control module. The power module may include a power supply and a first capacitor and a second capacitor that are connected in series and then connected in parallel to two ends of the power supply. The switch module may include a first switch unit, a second switch unit, and a third switch unit. The control module may be separately connected to the first switch unit, the second switch unit, and the third switch unit. The control module may control each of the first switch unit, the second switch unit, and the third switch unit to be turned on or turned off, so that different switch units in the switch module are selected to bear a conduction loss or a switching loss.

19 Claims, 16 Drawing Sheets

(56) References Cited

U.S. PATENT DOCUMENTS

| | | | | |
|---|---|---|---|---|
| 8,582,331 B2 * | 11/2013 | Frisch | ................ | H03K 17/6871 |
| | | | | 363/56.02 |
| 9,093,923 B2 * | 7/2015 | Ying | ................... | H02M 7/5387 |
| 10,177,683 B2 * | 1/2019 | Shi | ........................ | H02M 7/483 |
| 2003/0206423 A1 * | 11/2003 | Ikimi | ...................... | H02M 1/34 |
| | | | | 363/58 |
| 2009/0003024 A1 * | 1/2009 | Knaup | .................. | H02M 7/538 |
| | | | | 363/124 |
| 2019/0238062 A1 * | 8/2019 | Lu | .......................... | H02M 7/537 |
| 2020/0177100 A1 * | 6/2020 | Wang | .................. | H02M 7/5387 |
| 2020/0280267 A1 * | 9/2020 | Restrepo | ........... | H02M 7/53871 |
| 2023/0216431 A1 * | 7/2023 | Shirouchi | ............... | H02M 1/32 |

FOREIGN PATENT DOCUMENTS

| | | | |
|---|---|---|---|
| CN | 209151022 U | | 7/2019 |
| CN | 119696348 A | * | 3/2025 |
| EP | 2662966 A1 | | 11/2013 |

OTHER PUBLICATIONS

Wang et al., "Efficiency Improvement of 2- and 3-level Inverters for Distributed Photovoltaic Application Using Hybrid Devices", 2nd International Future Energy Electronics Conference (IFEEC), IEEE, 2015, 7 pages.

Wang et al., "A Seven-Switch Five-Level Active-Neutral-Point-Clamped Converter and Its Optimal Modulation Strategy", IEEE Transactions on Power Electronics, IEEE, Jul. 2017, 16 pages.

* cited by examiner

TO

CONT.
FROM

CONT.
FROM

TO

TO

NEUTRAL POINT CLAMPED INVERTER AND PHOTOVOLTAIC POWER SUPPLY SYSTEM

CROSS-REFERENCE TO RELATED APPLICATIONS

This application is a continuation of International Application No. PCT/CN2021/094124, filed on May 17, 2021, which claims priority to Chinese Patent Application No. 202011341053.1, filed on Nov. 25, 2020. The disclosures of the aforementioned applications are hereby incorporated by reference in their entireties.

TECHNICAL FIELD

The embodiments relate to the field of electronic circuits, a neutral point clamped inverter, and a photovoltaic power supply system.

BACKGROUND

Currently, a three-level neutral point clamped (NPC) inverter is widely used in a power supply system that converts a direct current into an alternating current. A typical three-level NPC inverter may include an external switching transistor and an internal switching transistor, and a fixed internal switching transistor may be used to bear losses (for example, a switching loss or a conduction loss) of the three-level NPC inverter in different working conditions. When the three-level NPC inverter runs in a working condition in which active power is output, the internal switching transistor generates a conduction loss, and it is suitable to select a switching device with a low conduction loss. However, when the three-level NPC inverter runs in a working condition in which reactive power is output, the internal switching transistor generates a switching loss, and it is suitable to select a switching device with a low switching loss. The switching device with a low conduction loss has an excessively high switching loss. Therefore, a low switching loss and a low conduction loss of the internal switching transistor cannot be simultaneously met, in other words, it cannot be ensured that the three-level NPC inverter highly efficiently runs in all working conditions, and there is an excessively high loss and low efficiency.

SUMMARY

The embodiments may provide a neutral point clamped inverter and a photovoltaic power supply system, so that different switch units may be flexibly selected to bear a conduction loss or a switching loss, to reduce losses of the neutral point clamped inverter in all working conditions and achieve higher efficiency and higher applicability.

According to a first aspect, the embodiments may provide a neutral point clamped inverter. The neutral point clamped inverter may include a power module, a switch module, and a control module. The power module may include a power supply and a first capacitor and a second capacitor that are connected in series and then connected in parallel to two ends of the power supply. The switch module may include a first switch unit, a second switch unit, and a third switch unit. A first connection end of the first switch unit is connected to a positive electrode of the power supply, a second connection end of the first switch unit is connected to a first connection end of the third switch unit, a third connection end of the first switch unit is connected to a first connection end of the second switch unit and a load, a second connection end of the second switch unit is connected to a second connection end of the third switch unit, a third connection end of the second switch unit is connected to a negative electrode of the power supply and the load, and a third connection end of the third switch unit is connected to the first capacitor and the second capacitor. Any switch unit in the switch module herein may include at least one switch and/or diode. The control module may be separately connected to the first switch unit, the second switch unit, and the third switch unit. The control module may be configured to control each of the first switch unit, the second switch unit, and the third switch unit to be turned on or turned off, so that different switch units in the switch module are selected to bear a conduction loss or a switching loss. In the neutral point clamped inverter, the control module may control different switch units to be turned on or turned off, so that different switch units may be flexibly selected in different working conditions to bear the conduction loss or the switching loss, to reduce losses of the inverter in all working conditions, improve running efficiency of the inverter, and achieve higher flexibility and higher applicability.

With reference to the first aspect, in a first possible implementation, the neutral point clamped inverter may further include a filtering module. The filtering module may include an inductor and a third capacitor, one end of the inductor is separately connected to the third connection end of the first switch unit and the first connection end of the second switch unit, the other end of the inductor is separately connected to one end of the third capacitor and the load, and the other end of the third capacitor is connected to the second connection end of the second switch unit and the load. In the neutral point clamped inverter, the filtering module may filter out a ripple in an output voltage of the inverter to obtain an alternating current signal with a better property, to achieve higher efficiency and higher applicability.

With reference to the first aspect or the first possible implementation of the first aspect, in a second possible implementation, the third switch unit may include a first switch, a first diode, and a second diode. A cathode of the first diode and a first electrode of the first switch are connected to serve as the first connection end of the third switch unit, an anode of the second diode and a second electrode of the first switch are connected to serve as the second connection end of the third switch unit, and an anode of the first diode and a cathode of the second diode are connected to serve as the third connection end of the third switch unit. In the neutral point clamped inverter, the first switch may be selected to bear switching losses or conduction losses of the neutral point clamped inverter running in different working conditions (for example, working conditions in which active power is output or reactive power is output), to reduce losses of the inverter in all working conditions, improve running efficiency of the inverter, and achieve higher applicability.

With reference to the second possible implementation of the first aspect, in a third possible implementation, the first switch unit may include a second switch and a third switch, and the second switch unit may include a fourth switch and a fifth switch. A first electrode of the second switch serves as the first connection end of the first switch unit, a second electrode of the second switch and a first electrode of the third switch are connected to serves as the second connection end of the first switch unit, a second electrode of the third switch serves as the third connection end of the first switch unit, a first electrode of the fourth switch serves as the first connection end of the second switch unit, a second electrode of the fourth switch and a first electrode of the fifth switch are connected to serve as the second connection end of the second switch unit, and a second electrode of the fifth switch serves as the third connection end of the second switch unit. The control module is separately connected to third electrodes of all of the first switch, the second switch, the third switch, the fourth switch, and the fifth switch, to control all the switches to be turned on or turned off. It may be understood that herein, the first electrode may be a collector or a drain of different types of switches, the second electrode may be an emitter or a source of different types of switches, and the third electrode may be a base or a gate of different types of switches. In the neutral point clamped inverter, different switches (for example, the first switch, the third switch, or the fourth switch) may be flexibly selected to bear switching losses or conduction losses of the neutral point clamped inverter running in different working conditions, to reduce losses of the inverter in all working conditions, improve running efficiency of the inverter, and achieve higher flexibility and higher applicability.

With reference to the third possible implementation of the first aspect, in a fourth possible implementation, the control module is configured to control each of the first switch, the second switch, the third switch, the fourth switch, and the fifth switch to be turned on or turned off, so that when the neutral point clamped inverter outputs active power to the load, the first switch, the third switch, and the fourth switch are selected to bear the conduction loss based on current paths that are turned on in parallel, or when the neutral point clamped inverter outputs reactive power to the load, the first switch is selected to bear the switching loss, and the third switch or the fourth switch is selected to bear the conduction loss, or the first switch is selected to bear the conduction loss, and the third switch or the fourth switch is selected to bear the switching loss. In the neutral point clamped inverter, the first switch, the third switch, and the fourth switch may be selected to independently or jointly bear switching losses or conduction losses in different working conditions (for example, working conditions in which active power is output or reactive power is output), to reduce losses of the inverter in all working conditions, improve running efficiency of the inverter, and achieve higher applicability.

With reference to the third possible implementation of the first aspect or the fourth possible implementation of the first aspect, in a fifth possible implementation, the first switch, the second switch, the third switch, the fourth switch, or the fifth switch may be an insulated gate bipolar transistor (IGBT) or a metal-oxide-semiconductor field-effect transistor (MOSFET). Herein, the IGBT may be a switching device with a low conduction loss, and the MOSFET may be a switching device with a low switching loss. The first switch, the second switch, the third switch, the fourth switch, or the fifth switch may be separately set to a switching device (for example, an IGBT or a MOSFET) with a low conduction loss or a low switching loss, so that different types of switches (for example, IGBTs or MOSFETs) may be flexibly selected to bear conduction losses or switching losses of the neutral point clamped inverter running in different working conditions, to reduce losses of the inverter in all working conditions, improve running efficiency of the inverter, and achieve higher flexibility and higher applicability.

With reference to the fifth possible implementation of the first aspect, in a sixth possible implementation, the first switch, the second switch, the third switch, the fourth switch, or the fifth switch may be made of a silicon (Si)

semiconductor material, a third generation wide-bandgap semiconductor material silicon carbide (SiC), gallium nitride (GaN), diamond, or zinc oxide (ZnO), or another material.

With reference to any one of the third possible implementation of the first aspect to the sixth possible implementation of the first aspect, in a seventh possible implementation, the first switch may be a MOSFET, and the second switch, the third switch, the fourth switch, and the fifth switch may be IGBTs. The first electrode, the second electrode, and the third electrode of the first switch are respectively a drain, a source, and a gate of the first switch, and in the second switch, the third switch, the fourth switch, and the fifth switch, the first electrode of each switch is a collector of each switch, the second electrode of each switch is an emitter of each switch, and the third electrode of each switch is a base of each switch. The MOSFET may be used as the first switch, and the IGBT may be used as the second switch, the third switch, the fourth switch, and the fifth switch. When the neutral point clamped inverter outputs reactive power to the load, the first switch with a low switching loss may be selected to bear the switching loss, and the third switch or the fourth switch with a low conduction loss may be selected to bear the conduction loss, to reduce losses of the inverter in all working conditions, improve running efficiency of the inverter, and achieve higher applicability.

With reference to any one of the third possible implementation of the first aspect to the sixth possible implementation of the first aspect, in an eighth possible implementation, the first switch, the second switch, and the fifth switch may be IGBTs, and the third switch and the fourth switch may be MOSFETs. In the first switch, the second switch, and the fifth switch, the first electrode of each switch is a collector of each switch, the second electrode of each switch is an emitter of each switch, and the third electrode of each switch is a base of each switch, the first electrodes of the third switch and the fourth switch are drains of the third switch and the fourth switch, the second electrodes of the third switch and the fourth switch are sources of the third switch and the fourth switch, and the third electrodes of the third switch and the fourth switch are gates of the third switch and the fourth switch. The IGBT may be used as the first switch, the second switch, and the fifth switch, and the MOSFET may be used as the third switch and the fourth switch. When the neutral point clamped inverter outputs active power to the load, the first switch, the third switch, and the fourth switch may be selected to bear the conduction loss based on the current paths that are turned on in parallel. When the neutral point clamped inverter outputs reactive power to the load, the first switch with a low conduction loss may be selected to bear the conduction loss, and the third switch or the fourth switch with a low switching loss may be selected to bear the switching loss, to reduce losses of the inverter in all working conditions, improve running efficiency of the inverter, and achieve higher applicability.

With reference to any one of the third possible implementation of the first aspect to the eighth possible implementation of the first aspect, in a ninth possible implementation, the control module may be configured to generate a control signal used to control each of the first switch, the second switch, the third switch, the fourth switch, and the fifth switch. The control signal herein is used to control each switch to be turned on or turned off, so as to turn on or turn off each switch unit. The control signal generated by the control module may be used to control each switch to be turned on or turned off, so that different switches may be flexibly selected to independently or jointly bear switching losses or conduction losses in different working conditions, to reduce losses of the inverter in all working conditions, improve running efficiency of the inverter, and achieve higher flexibility and higher applicability.

With reference to the ninth possible implementation of the first aspect, in a tenth possible implementation, the control module may be configured to: control the first switch to be turned on, control, after a first preset delay time, the fourth switch to be turned on, and control, after a second preset delay time existing after the fourth switch is controlled to be turned off, the first switch to be turned off; or control the first switch to be turned on, control, after a third preset delay time, the third switch to be turned on, and control, after a fourth preset delay time existing after the third switch is controlled to be turned off, the first switch to be turned off. The control module may control, based on different preset delay times, the first switch, the third switch, and the fourth switch to be turned on or turned off, so that the first switch may be selected to bear a switching loss in a working condition in which the neutral point clamped inverter outputs reactive power to the load, and the third switch or the fourth switch may be selected to bear conduction losses in different working conditions. Herein, the first switch is a switching device (for example, a MOSFET) with a low switching loss, and the third switch and the fourth switch are switching devices (for example, IGBTs) with a low conduction loss. Therefore, losses of the inverter in all working conditions are reduced, running efficiency of the inverter is improved, and higher applicability is achieved.

With reference to the ninth possible implementation of the first aspect, in an eleventh possible implementation, the control module may be configured to: control the fourth switch to be turned on, control, after a first preset delay time, the first switch to be turned on, and control, after a second preset delay time existing after the first switch is controlled to be turned off, the fourth switch to be turned off; or control the third switch to be turned on, control, after a third preset delay time, the first switch to be turned on, and control, after a fourth preset delay time existing after the first switch is controlled to be turned off, the third switch to be turned off. The control module may control, based on different preset delay times, the first switch, the third switch, and the fourth switch to be turned on or turned off, so that the first switch, the third switch, and the fourth switch may be selected to bear, based on the current paths that are turned on in parallel, a conduction loss existing when active power is output, and the first switch may be selected to bear a conduction loss existing when reactive power is output, and the third switch or the fourth switch may be selected to bear a switching loss existing when reactive power is output. Herein, the first switch is a switching device (for example, an IGBT) with a low conduction loss, and the third switch and the fourth switch are switching devices (for example, MOSFETs) with a low switching loss. Therefore, losses of the inverter in all working conditions are reduced, running efficiency of the inverter is improved, and higher applicability is achieved.

With reference to the tenth possible implementation of the first aspect or the eleventh possible implementation of the first aspect, in a twelfth possible implementation, the control module is configured to determine the first preset delay time, the second preset delay time, the third preset delay time, and the fourth preset delay time based on a device junction temperature corresponding to each of the first switch, the second switch, the third switch, the fourth switch, and the fifth switch and a load current flowing through the load. The control module may determine different preset delay times, and control, based on the different preset delay times, the first switch, the third switch, and the fourth switch to be turned on or turned off, so that the first switch, the third switch, and the fourth switch may be selected to independently or jointly bear switching losses or conduction losses in different working conditions, to reduce losses of the inverter in all working conditions, improve running efficiency of the inverter, and achieve higher applicability.

According to a second aspect, the embodiments may provide a photovoltaic power supply system. The photovoltaic power supply system may include a photovoltaic array and the neutral point clamped inverter that is connected to the photovoltaic array and that is provided in any one of the first aspect to the twelfth possible implementation of the first aspect. It may be understood that the photovoltaic array herein may be connected to a direct current side of the neutral point clamped inverter, to provide a direct current input voltage to the neutral point clamped inverter, and an alternating current side of the neutral point clamped inverter may be connected to a load, to provide an alternating current to the load. The photovoltaic array may include a plurality of photovoltaic modules (which may also be referred to as solar panels or photovoltaic panels) and/or another photovoltaic power supply device.

In the neutral point clamped inverter, different switch units may be flexibly selected, based on the control module, to bear switching losses or conduction losses in different working conditions (for example, working conditions in which active power is output or reactive power is output), to reduce losses of the inverter in all working conditions, improve running efficiency of the inverter, and achieve higher flexibility and higher applicability.

DETAILED DESCRIPTION OF THE EMBODIMENTS

An inverter is a converter that converts a direct current (for example, a battery or a storage battery) into a constantfrequency and constant-voltage alternating current or a frequency-modulated and voltage-regulated alternating current. The inverter (for example, a neutral point clamped inverter) may include an inverter bridge circuit, a control logic circuit, and a filter circuit, and is widely used in an electrical device (for example, a home device) and a power grid. For example, the inverter may be connected to a storage battery to drive the electrical device to work, or the inverter may transmit a high-voltage alternating current with high power to the power grid. A neutral point clamped inverter may also be referred to as an NPC inverter, a three-level neutral point clamped inverter, or a three-level NPC inverter. The neutral point clamped inverter is applicable to a plurality of application fields such as the field of photovoltaic power generation (for example, supplies power to a home device (for example, a refrigerator or an air conditioner) or a power grid), the field of wind power generation, or the field of high-power converters (for example, converts a direct current into a high-voltage alternating current with high power). This may be determined based on an actual application scenario and is not limited herein.

The neutral point clamped inverter may include a power module, a switch module, and a control module. The power module may include a power supply and a first capacitor and a second capacitor that are connected in series and then connected in parallel to two ends of the power supply. The switch module may include a first switch unit, a second switch unit, and a third switch unit. The control module may be separately connected to the first switch unit, the second switch unit, and the third switch unit. The control module may be configured to control each of the first switch unit, the second switch unit, and the third switch unit to be turned on or turned off, so that different switch units in the switch module are selected to bear a conduction loss or a switching loss. In the neutral point clamped inverter, different switch units may be flexibly selected, based on the control module, to bear switching losses or conduction losses in different working conditions (for example, working conditions in which active power is output or reactive power is output), to reduce losses of the inverter in all working conditions, improve running efficiency of the inverter, and achieve higher flexibility and higher applicability. The neutral point clamped inverter may be adapted to different application scenarios, for example, any application scenario in which a direct current needs to be converted into an alternating current, for example, a solar power supply scenario and a wind power supply scenario. The solar power supply scenario is used as an example for description.

Figure 1:
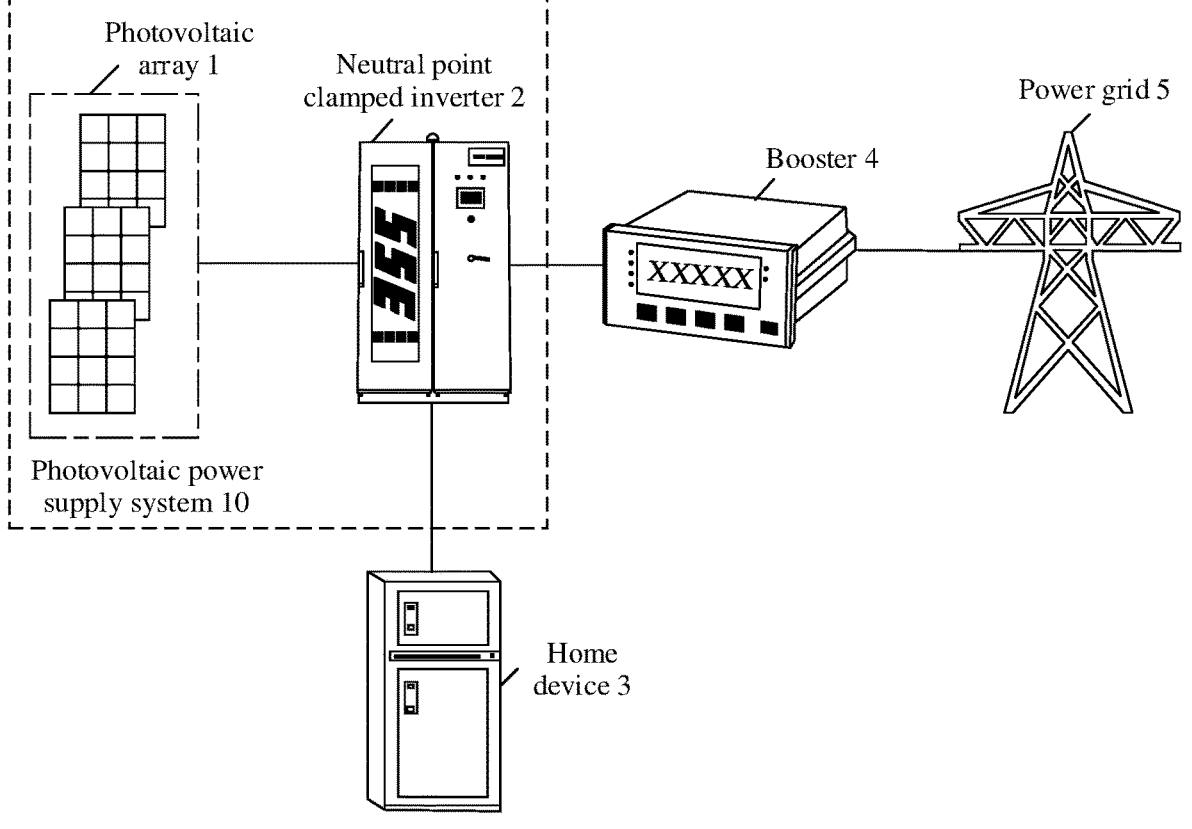
FIG. 1 is a schematic diagram of an application scenario of a neutral point clamped inverter.

FIG. 1 is a schematic diagram of an application scenario of a neutral point clamped inverter. As shown in FIG. 1, a photovoltaic power supply system (for example, a photovoltaic power supply system 10) may include a photovoltaic array (for example, a photovoltaic array 1) and a neutral point clamped inverter (for example, a neutral point clamped inverter 2) connected to the photovoltaic array. The photovoltaic array 1 may include a plurality of photovoltaic modules (which may also be referred to as solar panels or photovoltaic panels) and/or another photovoltaic power supply device (for example, a photovoltaic junction box). The photovoltaic array 1 herein may be connected to a direct current side of the neutral point clamped inverter 2, to provide a direct current input voltage to the neutral point clamped inverter 2. In other words, the photovoltaic array 1 provides a direct current to the neutral point clamped inverter 2. A voltage value of the direct current input voltage may be a direct current of 12 V, 24 V, 36 V, 48 V, or another voltage value. An alternating current side of the neutral point clamped inverter 2 may be directly or indirectly connected to a load (for example, a home device 3 or a power grid 5). The neutral point clamped inverter 2 may convert the direct current provided by the photovoltaic array 1 into an alternating current (for example, a sinusoidal alternating current of 220 V and 50 Hz or an alternating current of another voltage value), and supply power to the home device 3 (for example, a refrigerator or an air conditioner). Optionally, the neutral point clamped inverter 2 may further input an alternating current to a booster 4. The booster 4 may boost the alternating current input by the neutral point clamped inverter 2 to a high-voltage current (for example, a high-voltage current of 32 kV, 110 kV, 220 kV, or another voltage value), and input a boosted high-voltage current to a high-voltage power grid (for example, the power grid 5). This may be determined based on an actual application scenario and is not limited herein. Losses of the neutral point clamped inverter (for example, the neutral point clamped inverter 2) in all working conditions can be reduced, running efficiency of the inverter can be improved, power supply efficiency can be further improved, and higher applicability can be achieved.

With reference to FIG. 2 to FIG. 12, the neutral point clamped inverter and a working principle of the neutral point clamped inverter are described below by using examples.

Figure 2:
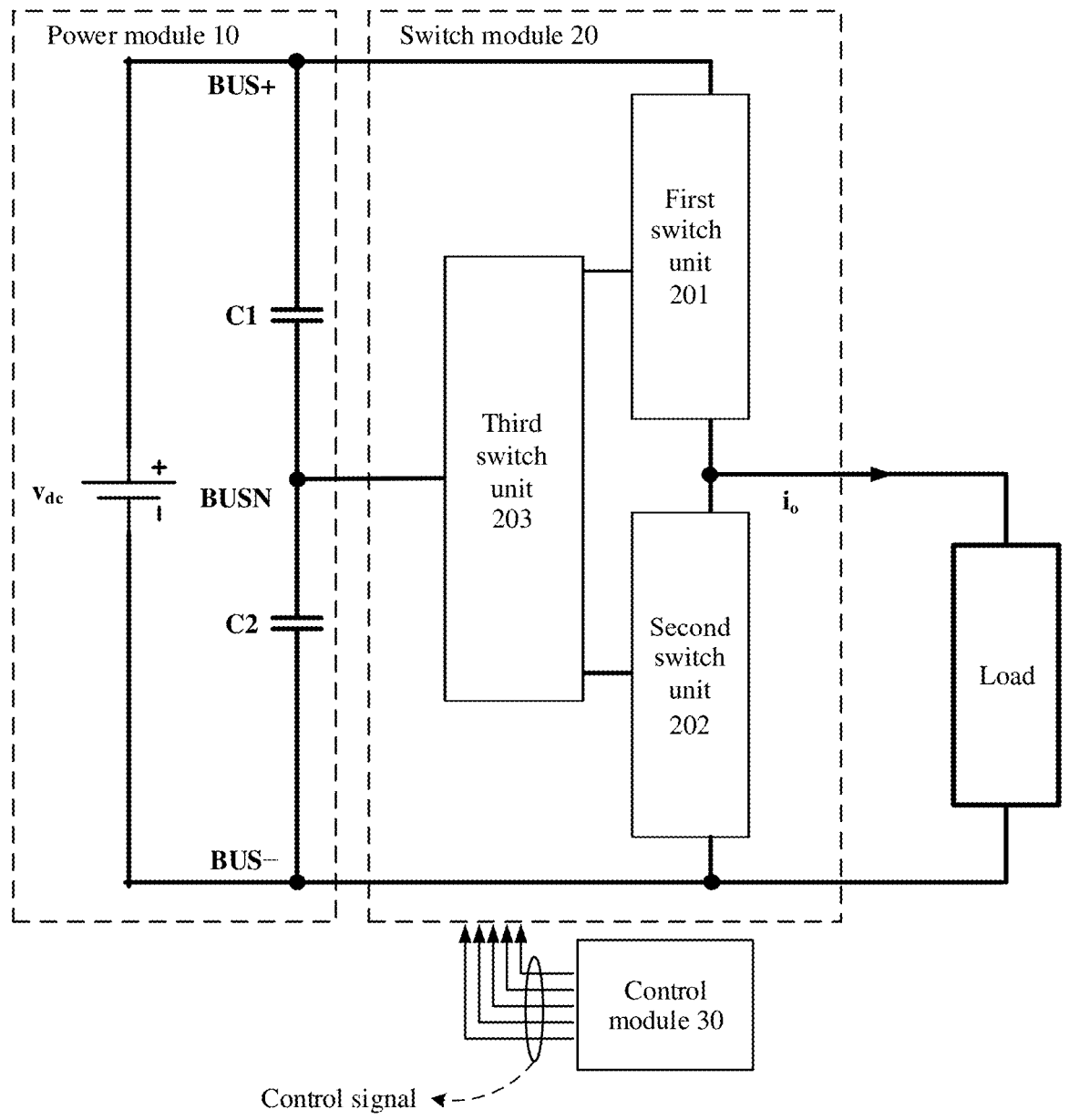
FIG. 2 is a schematic circuit diagram of a neutral point clamped inverter.

FIG. 2 is a schematic circuit diagram of a neutral point clamped inverter. As shown in FIG. 2, the neutral point clamped inverter may include a power module 10, a switch module 20, and a control module 30. The power module 10 may include a power supply and a first capacitor C1 and a second capacitor C2 that are connected in series and then connected in parallel to two ends of the power supply. The power supply herein is a direct current input power supply, and a power supply voltage may be $V_{dc}$. The first capacitor C1 and the second capacitor C2 may be direct current bus capacitors. Voltages at two ends of the first capacitor C1 are respectively a positive terminal voltage BUS, $(BUS_+ = V_{dc}/2)$ and a neutral point voltage BUSN, and voltages at two ends of the second capacitor C2 are respectively a neutral point voltage BUSN and a negative terminal voltage BUS_ $(BUS_- = -V_{dc}/2)$. The switch module 20 may include at least one switch unit, for example, may include a first switch unit 201, a second switch unit 202, and a third switch unit 203. A first connection end of the first switch unit 201 may be connected to a positive electrode of the power supply, a second connection end of the first switch unit 201 may be connected to a first connection end of the third switch unit 203, a third connection end of the first switch unit 201 may be connected to a first connection end of the second switch unit 202 and a load, a second connection end of the second switch unit 202 may be connected to a second connection end of the third switch unit 203, a third connection end of the second switch unit 202 may be connected to a negative electrode of the power supply and the load, and a third connection end of the third switch unit 203 may be connected to the first capacitor C1 and the second capacitor C2. A current flowing through the load may be represented as $i_0$, and an output voltage of the neutral point clamped inverter may be represented as $V_{out}$. It should be understood that any switch unit in the switch module 20 may include at least one switch and/or diode, or any switch unit may include at least one switch, diode, capacitor, inductor, and/or another device. This may be determined based on an actual application scenario and is not limited herein. The control module 30 may be separately connected to the first switch unit 201, the second switch unit 202, and the third switch unit 203. The control module 30 may control each of the first switch unit 201, the second switch unit 202, and the third switch unit 203 to be turned on or off, so that any one of the first switch unit 201, the second switch unit 202, and the third switch unit 203 is selected to independently bear a conduction loss or a switching loss, or any two or three of the first switch unit 201, the second switch unit 202, and the third switch unit 203 are selected to jointly bear a conduction loss or a switching loss. In this way, different switch units in the switch module 20 may be flexibly selected to independently or jointly bear conduction losses or switching losses of the neutral point clamped inverter in different working conditions, to achieve higher flexibility and higher applicability.

Figure 3:
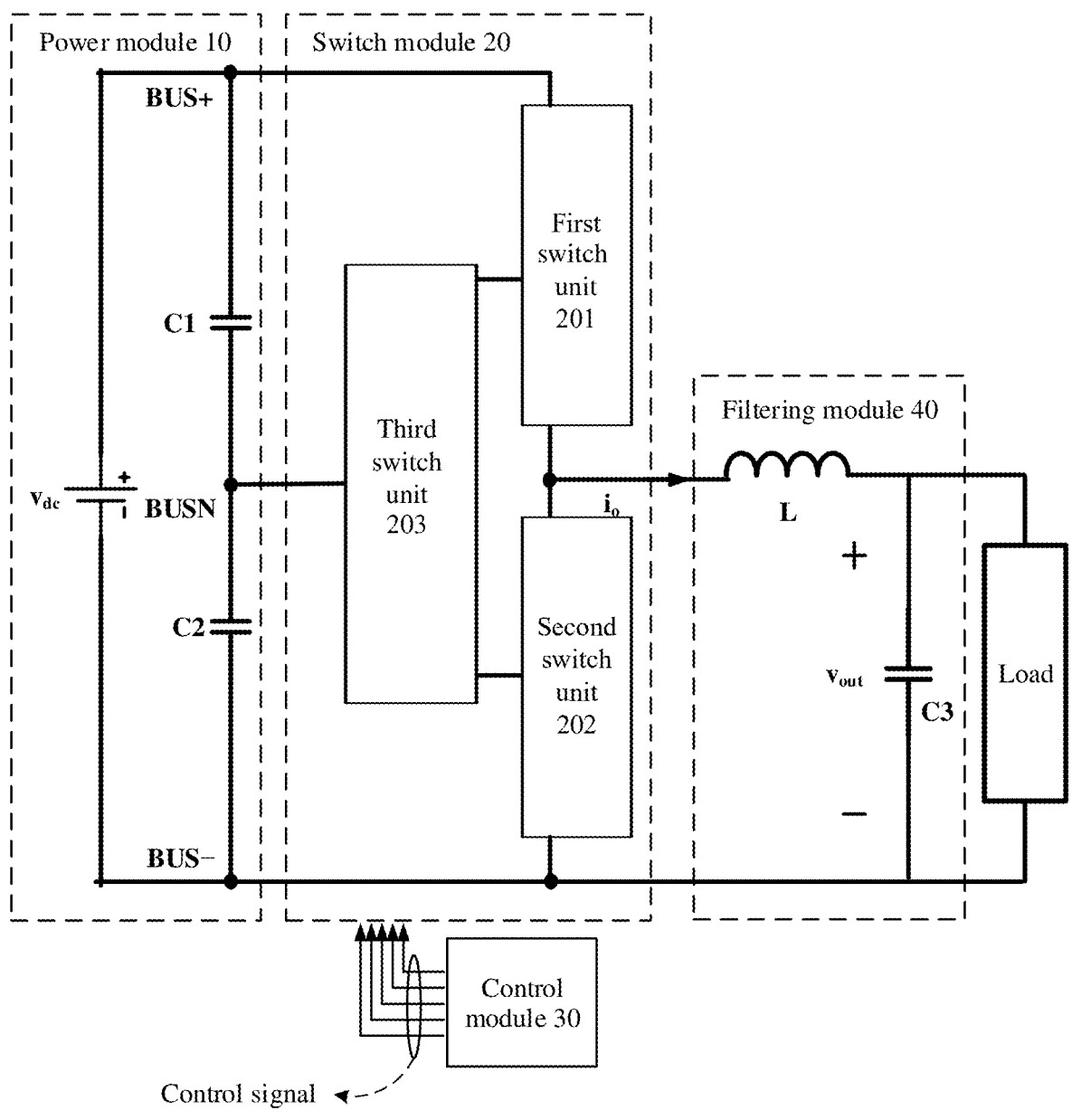
FIG. 3 is another schematic circuit diagram of a neutral point clamped inverter.
Figure 4:
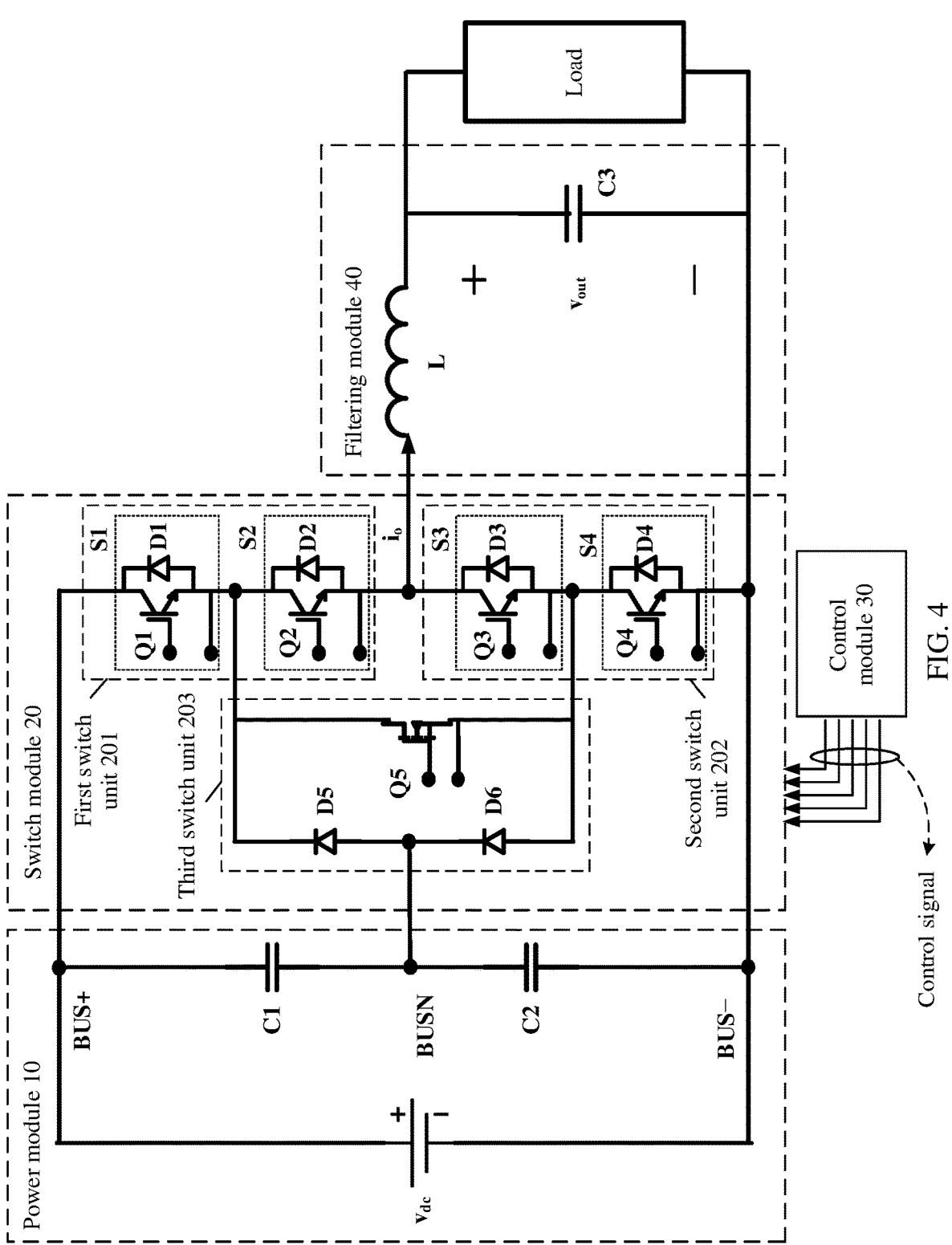
FIG. 4 is another schematic circuit diagram of a neutral point clamped inverter.

FIG. 3 is another schematic circuit diagram of a neutral point clamped inverter. As shown in FIG. 3, the neutral point clamped inverter shown in FIG. 2 may further include a filtering module 40. The filtering module 40 may include an inductor L and a third capacitor C3. One end of the inductor L is separately connected to the third connection end of the first switch unit 201 and the first connection end of the second switch unit 202, the other end of the inductor L is separately connected to one end of the third capacitor C3 and the load, and the other end of the third capacitor C3 is connected to the second connection end of the second switch unit 202 and the load. FIG. 4 is another schematic circuit diagram of a neutral point clamped inverter. As shown in FIG. 4, the first switch unit 201 shown in FIG. 3 may include a second switch S1 and a third switch S2, the second switch unit 202 shown in FIG. 3 may include a fourth switch S3 and a fifth switch S4, and the third switch unit 203 shown in FIG. 3 may include a first switch Q5, a first diode D5, and a second diode D6. The second switch S1 may include a switching device Q1 and a freewheeling diode D1 connected in parallel to two ends of the switching device Q1. The third switch S2 may include a switching device Q2 and a freewheeling diode D2 connected in parallel to two ends of the switching device Q2. The fourth switch S3 may include a switching device Q3 and a freewheeling diode D3 connected in parallel to two ends of the switching device Q3. The fifth switch S4 may include a switching device Q4 and a freewheeling diode D4 connected in parallel to two ends of the switching device Q4. For the first switch unit 201, a first electrode of the second switch S1 serves as the first connection end of the first switch unit 201, a second electrode of the second switch S1 and a first electrode of the third switch S2 are connected to serve as the second connection end of the first switch unit 201, and a second electrode of the third switch S2 serves as the third connection end of the first switch unit 201. For the second switch unit 202, a first electrode of the fourth switch S3 serves as the first connection end of the second switch unit 202, a second electrode of the fourth switch S3 and a first electrode of the fifth switch S4 are connected to serve as the second connection end of the second switch unit 202, and a second electrode of the fifth switch S4 serves as the third connection end of the second switch unit 202. For the third switch unit 203, a cathode of the first diode D5 and a first electrode of the first switch Q5 are connected to serve as the first connection end of the third switch unit 203, an anode of the second diode D6 and a second electrode of the first switch Q5 are connected to serve as the second connection end of the third switch unit 203, and an anode of the first diode D5 and a cathode of the second diode D6 are connected to serve as the third connection end of the third switch unit 203. As shown in FIG. 4, the control module 30 may be separately connected to third electrodes of all of the first switch Q5, the second switch S1, the third switch S2, the fourth switch S3, and the fifth switch S4, to control all the switches to be turned on or turned off. It may be understood that the first electrode may be a collector or a drain of different types of switches, the second electrode may be an emitter or a source of different types of switches, and the third electrode may be a base or a gate of different types of switches.

In some feasible implementations, the first switch Q5, the second switch S1, the third switch S2, the fourth switch S3, or the fifth switch S4 may be a MOSFET, an IGBT, or a diode made of a silicon (Si) semiconductor material, a third generation wide-bandgap semiconductor material silicon carbide (SiC), gallium nitride (GaN), diamond, or zinc oxide (ZnO), or another material. This may be determined based on an actual application scenario and is not limited herein. For example, as shown in FIG. 4, the first switch Q5 may be a MOSFET, and the second switch S1, the third switch S2, the fourth switch S3, and the fifth switch S4 may be IGBTs. It may be understood that the first electrode, the second electrode, and the third electrode of the first switch Q5 are respectively a drain, a source, and a gate of the first switch Q5. The first electrode of each of the second switch S1, the third switch S2, the fourth switch S3, and the fifth switch S4 may be a collector of each of the second switch S1, the third switch S2, the fourth switch S3, and the fifth switch S4, the second electrode of each of the second switch S1, the third switch S2, the fourth switch S3, and the fifth switch S4 may be an emitter of each of the second switch S1, the third switch S2, the fourth switch S3, and the fifth switch S4, and the third electrode of each of the second switch S1, the third switch S2, the fourth switch S3, and the fifth switch S4 may be a base of each of the second switch S1, the third switch S2, the fourth switch S3, and the fifth switch S4.

Figure 5:
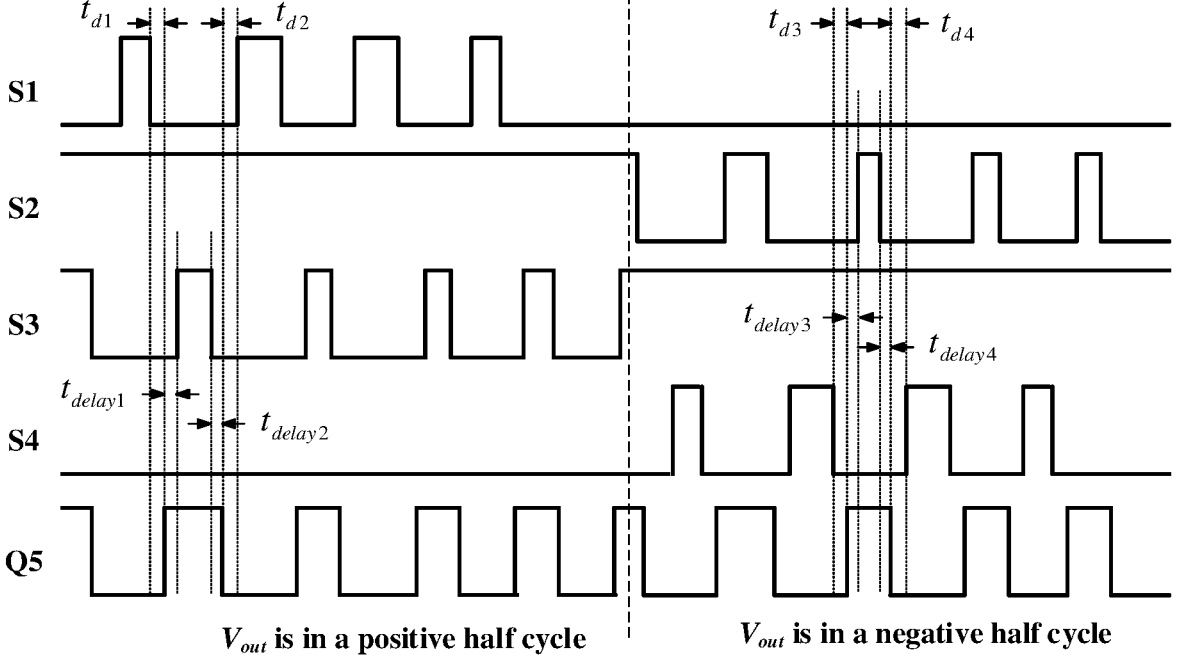
FIG. 5 is a schematic diagram of a switching time sequence of a neutral point clamped inverter.

In some feasible implementations, the control module 30 may generate a control signal used to control the first switch Q5, the second switch S1, the third switch S2, the fourth switch S3, and the fifth switch S4. For example, the control signal may be a pulse width modulation (PWM) signal, which may be referred to as a PWM signal for short, of the first switch Q5, the second switch S1, the third switch S2, the fourth switch S3, and the fifth switch S4. The control signal may be further understood as a PWM signal used to control the switching device Q1, the switching device Q2, the switching device Q3, the switching device Q4, and the first switch Q5. The control signal herein may be used to control each of the first switch Q5, the second switch S1, the third switch S2, the fourth switch S3, and the fifth switch S4 to be turned on or off. For example, the control signal may be (0 1 1 0 1) and may control the second switch S1 to be turned off, the third switch S2 to be turned on, the fourth switch S3 to be turned on, the fifth switch S4 to be turned off, and the first switch Q5 to be turned on. FIG. 5 is a schematic diagram of a switching time sequence of a neutral point clamped inverter. As shown in FIG. 5, when the output voltage $V_{out}$ of the neutral point clamped inverter is in a positive half cycle (namely, a positive half cycle), the third switch S2 remains in an on state, and the fifth switch S4 remains in an off state (namely, a cutoff state). The second switch S1, the fourth switch S3, and the first switch Q5 may work in a PWM mode, and the second switch S1 and the first switch Q5 may be complementary switches. It may be understood that the PWM mode is an effective mode in which an analog circuit is controlled by using a digital output signal of a microprocessor (for example, the control module 30). The complementary switches are a pair of push-pull switches. When one switch is turned on, the other switch is turned off. For example, the second switch S1 is turned on and the first switch Q5 is turned off, or the second switch S1 is turned off and the first switch Q5 is turned on. For the second switch S1 and the first switch Q5 that are used as complementary switches, to prevent the second switch S1 and the first switch Q5 from being simultaneously turned on, a dead time, for example, $t_{d1}$ or $t_{d2}$, needs to be added between the second switch S1 and the first switch Q5. Herein, $t_{d1}$ may be a dead time between a moment at which the second switch S1 is turned off and a moment at which the first switch Q5 is turned on, and $t_{d2}$ may be a dead time between a moment at which the first switch Q5 is turned off and a moment at which the second switch S1 is turned on. When the output voltage $V_{out}$ of the neutral point clamped inverter is in a negative half cycle (namely, a negative half cycle), the fourth switch S3 remains in an on state, and the second switch S1 remains in an off state (namely, a cutoff state). The third switch S2, the fifth switch S4, and the first switch Q5 work in a PWM mode, and the fifth switch S4 and the first switch Q5 are complementary switches. For the fifth switch S4 and the first switch Q5 that are used as complementary switches, to prevent the fifth switch S4 and the first switch Q5 from being simultaneously turned on, a dead time, for example, $t_{d3}$ or $t_{d4}$, needs to be added between the fifth switch S4 and the first switch Q5. Herein, $t_{d3}$ may be a dead time between a moment at which the fifth switch S4 is turned off and a moment at which the first switch Q5 is turned on, and $t_{d4}$ may be a dead time between a moment at which the first switch Q5 is turned off and a moment at which the fifth switch S4 is turned on.

In some feasible implementations, when the first switch Q5, the second switch S1, the third switch S2, the fourth switch S3, and the fifth switch S4 are different types of switches (for example, IGBTs or MOSFETs), the control module 30 may set a different first preset time, second preset time, third preset time, and fourth preset time to control the first switch Q5, the third switch S2, and the fourth switch S3 to be turned on or turned off. If the first switch Q5 is a MOSFET, and the second switch S1, the third switch S2, the fourth switch S3, and the fifth switch S4 are IGBTs, when the output voltage $V_{out}$ of the neutral point clamped inverter is in the positive half cycle, the control module 30 may control the first switch Q5 to be turned on, control, after the first preset delay time (for example, a preset delay time $t_{delay}$), the fourth switch S3 to be turned on, and control, after the second preset delay time (for example, a preset delay time $t_{delay2}$) existing after the fourth switch S3 is controlled to be turned off, the first switch Q5 to be turned off; or when the output voltage $V_{out}$ of the neutral point clamped inverter is in the negative half cycle, the control module 30 may control the first switch Q5 to be turned on, control, after the third preset delay time (for example, a preset delay time $t_{delay3}$), the third switch S2 to be turned on, and control, after the fourth preset delay time (for example, a preset delay time $t_{delay4}$) existing after the third switch S2 is controlled to be turned off, the first switch Q5 to be turned off.

Figures 6A, 6B:
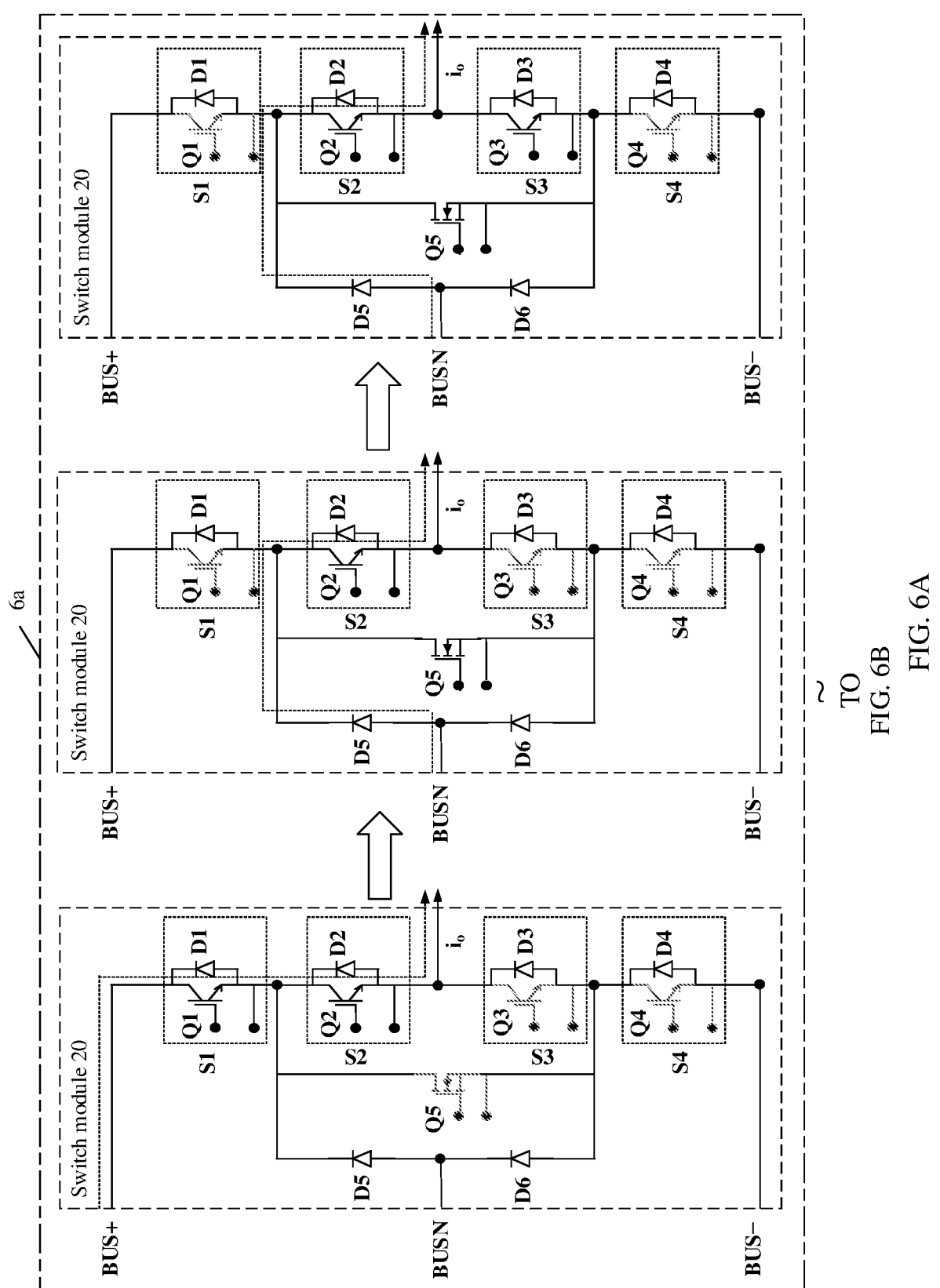
FIG. 6A and FIG. 6B are a schematic diagram of a commutation loop existing when a neutral point clamped inverter outputs active power.
Figures 6A, 6B:
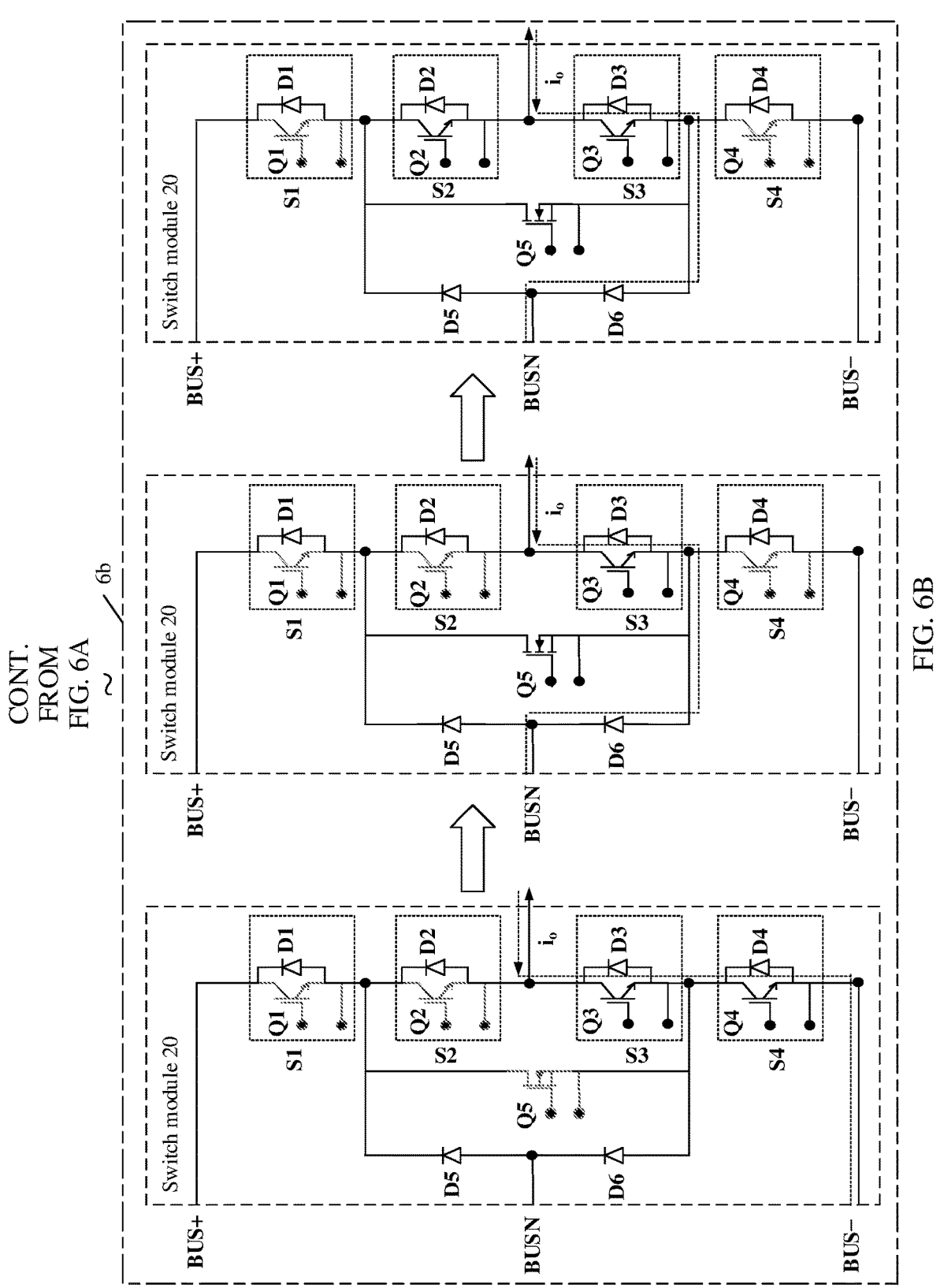

For ease of description, with reference to FIG. 6A, FIG. 6B, FIG. 7A, and FIG. 7B, a working principle of the switch module in the neutral point clamped inverter is described below by using an example. FIG. 6A and FIG. 6B are a schematic diagram of a commutation loop existing when a neutral point clamped inverter outputs active power. As shown in FIG. 6A and FIG. 6B, when the output voltage $V_{out}$ of the neutral point clamped inverter is in the positive half cycle and the load current $i_0$ is greater than 0, the neutral point clamped inverter outputs active power to the load, in other words, the neutral point clamped inverter runs in a working condition in which active power is output. In this working condition, the second switch S1, the fourth switch S3, and the first switch Q5 work in the PWM mode. In this case, a commutation loop existing when the switches are in different switching states may be shown in 6a in FIG. 6A and FIG. 6B. The switching state herein may refer to an on state or an off state (which may also be referred to as a cutoff state). As shown in 6a in FIG. 6A and FIG. 6B, when the switching device Q1 is turned on, the current flows through the switching device Q1 and the switching device Q2. When the switching device Q1 is cut off and the first switch Q5 is turned on, there are two current paths: a current path that flows through the first diode D5, the first switch Q5, and the freewheeling diode D3 and a current path that flows through the first diode D5 and the switching device Q2. The switching device Q2 has a lower conduction voltage drop, and therefore the current flows through the first diode D5 and the switching device Q2. After the preset delay time $t_{delay}$, the switching device Q3 is turned on, and the current still flows through the first diode D5 and the switching device Q2. It may be understood that the switching device Q1 and the first diode D5 participate in commutation, and generate a switching loss; the switching device Q2 is always turned on, and generates a conduction loss, and it may be further understood that the third switch S2 generates a conduction loss; and no current flows through the switching device Q3 and the first switch Q5, and no loss is generated.

When the output voltage $V_{out}$ of the neutral point clamped inverter is in the negative half cycle and the load current $i_0$ is less than 0, the neutral point clamped inverter outputs active power to the load, in other words, the neutral point clamped inverter runs in a working condition in which active power is output. In this working condition, the third switch S2, the fifth switch S4, and the first switch Q5 work in the PWM mode. In this case, a commutation loop existing when the switches are in different switching states may be shown in 6b in FIG. 6A and FIG. 6B. When the switching device Q4 is turned on, the current flows through the switching device Q3 and the switching device Q4. When the switching device Q4 is cut off and the first switch Q5 is turned on, there are two current paths: a current path that flows through the freewheeling diode D2, the first switch Q5, and the second diode D6 and a current path that flows through the switching device Q3 and the second diode D6. The switching device Q3 has a lower conduction voltage drop, and therefore the current flows through the switching device Q3 and the second diode D6. After the preset delay time $t_{delay3}$, the switching device Q2 is turned on, and the current still flows through the switching device Q3 and the second diode D6. It may be understood that the switching device Q4 and the second diode D6 participate in commutation, and generate a switching loss; the switching device Q3 is always turned on, and generates a conduction loss, and it may be further understood that the fourth switch S3 generates a conduction loss; and no current flows through the switching device Q2 and the first switch Q5, and no loss is generated.

Figure 7A:
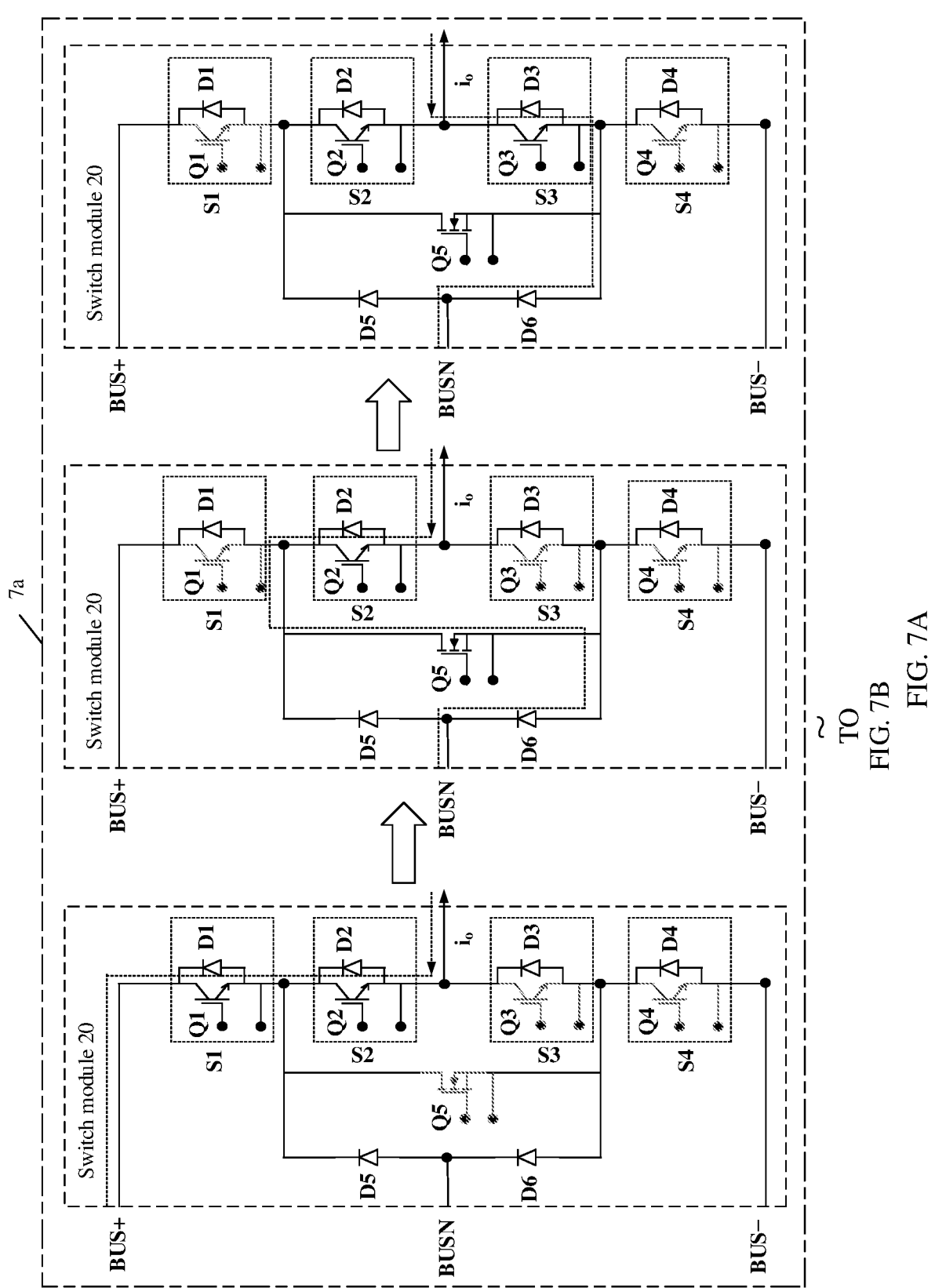
FIG. 7A and FIG. 7B are a schematic diagram of a commutation loop existing when a neutral point clamped inverter outputs reactive power.
Figures 7A, 7B:
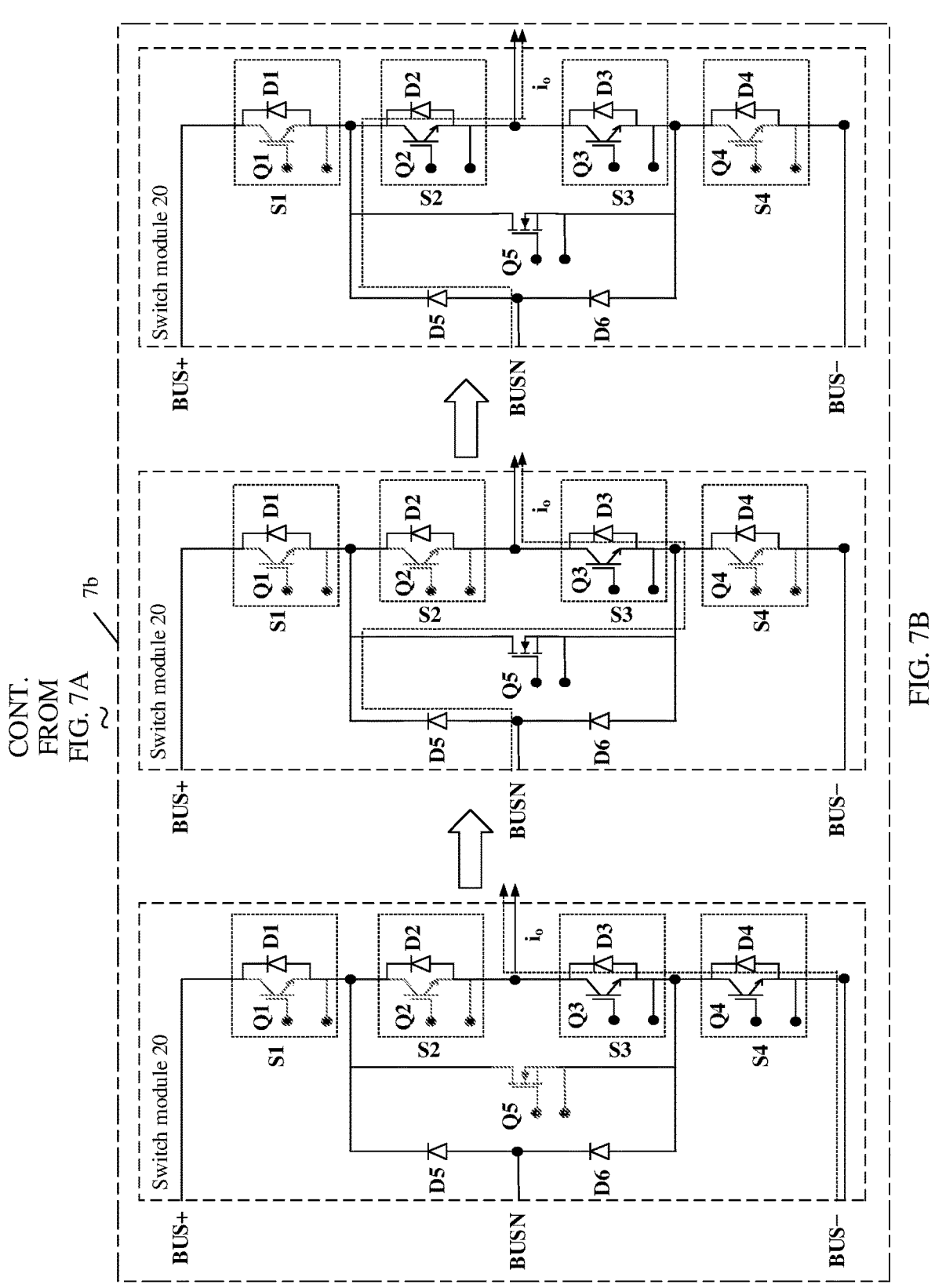

FIG. 7A and FIG. 7B are a schematic diagram of a commutation loop existing when a neutral point clamped inverter outputs reactive power. As shown in FIG. 7A and FIG. 7B, when the output voltage $V_{out}$ of the neutral point clamped inverter is in the positive half cycle and the load current $i_0$ is less than 0, the neutral point clamped inverter outputs reactive power to the load, in other words, the neutral point clamped inverter runs in a working condition in which reactive power is output. In this working condition, the second switch S1, the fourth switch S3, and the first switch Q5 work in the PWM mode. In this case, a commutation loop existing when the switches are in different switching states may be shown in 7a in FIG. 7A and FIG.

7B. When the switching device Q1 is turned on, the current flows through the freewheeling diode D2 and the freewheeling diode D1. When the switching device Q1 is cut off and the first switch Q5 is turned on, the current flows through the freewheeling diode D2, the first switch Q5, and the second diode D6. After the preset delay time $t_{delay}$, the switching device Q3 is turned on. In this case, there are two current paths: a current path that flows through the freewheeling diode D2, the first switch Q5, and the second diode D6 and a current path that flows through the switching device Q3 and the second diode D6. There is a lower conduction voltage drop in the current path that flows through the switching device Q3 and the second diode D6, and therefore the current flows through the switching device Q3 and the second diode D6. It may be understood that the first switch Q5 and the freewheeling diode D1 participate in commutation, and generate a switching loss; the freewheeling diode D2 generates a conduction loss; and the switching device Q3 is in a zero-voltage switching state, has no switching loss, and generates a conduction loss, and it may be further understood that the fourth switch S3 generates a conduction loss. The zero-voltage switching state herein may be understood as a state in which voltages at two ends of a switch (for example, the switching device Q3) are 0 when the switch is turned on or turned off.

When the output voltage $V_{out}$ of the neutral point clamped inverter is in the negative half cycle and the load current $i_0$ is greater than 0, the neutral point clamped inverter outputs reactive power to the load, in other words, the neutral point clamped inverter runs in a working condition in which reactive power is output. In this working condition, the third switch S2, the fifth switch S4, and the first switch Q5 work in the PWM mode. In this case, a commutation loop existing when the switches are in different switching states may be shown in 7b in FIG. 7A and FIG. 7B. When the switching device Q4 is turned on, the current flows through the freewheeling diode D4 and the freewheeling diode D3. When the switching device Q4 is cut off and the first switch Q5 is turned on, the current flows through the first diode D5, the first switch Q5, and the freewheeling diode D3. After the preset delay time $t_{delay3}$, the switching device Q2 is turned on. In this case, there are two current paths: a current path that flows through the first diode D5, the first switch Q5, and the freewheeling diode D3 and a current path that flows through the first diode D5 and the switching device Q2. There is a lower conduction voltage drop in the current path that flows through the first diode D5 and the switching device Q2, and therefore the current flows through the first diode D5 and the switching device Q2. It may be understood that the first switch Q5 and the freewheeling diode D4 participate in commutation, and generate a switching loss; the freewheeling diode D3 generates a conduction loss; and the switching device Q2 is in a zero-voltage switching state, has no switching loss, and generates a conduction loss, and it may be further understood that the third switch S2 generates a conduction loss.

With reference to the description of the embodiments in FIG. 6A, FIG. 6B, FIG. 7A, and FIG. 7B, it may be understood that when the neutral point clamped inverter outputs active power or reactive power to the load, the control module 30 may control each switch to be turned on or turned off, so that the third switch S2 or the fourth switch S3 is selected to bear the conduction loss, and the first switch Q5 is selected to bear the switching loss existing when the neutral point clamped inverter outputs reactive power to the load. Both the third switch S2 and the fourth switch S3 are switching devices with a low conduction loss, and the first switch Q5 is a switching device with a low switching loss. Therefore, the third switch S2 or the fourth switch S3 with a low conduction loss may be used to bear the conduction loss, and the first switch Q5 with a low switching loss may be used to bear the switching loss, to reduce running losses of the neutral point clamped inverter in all working conditions, improve running efficiency of the inverter, and achieve higher applicability.

Figure 8:
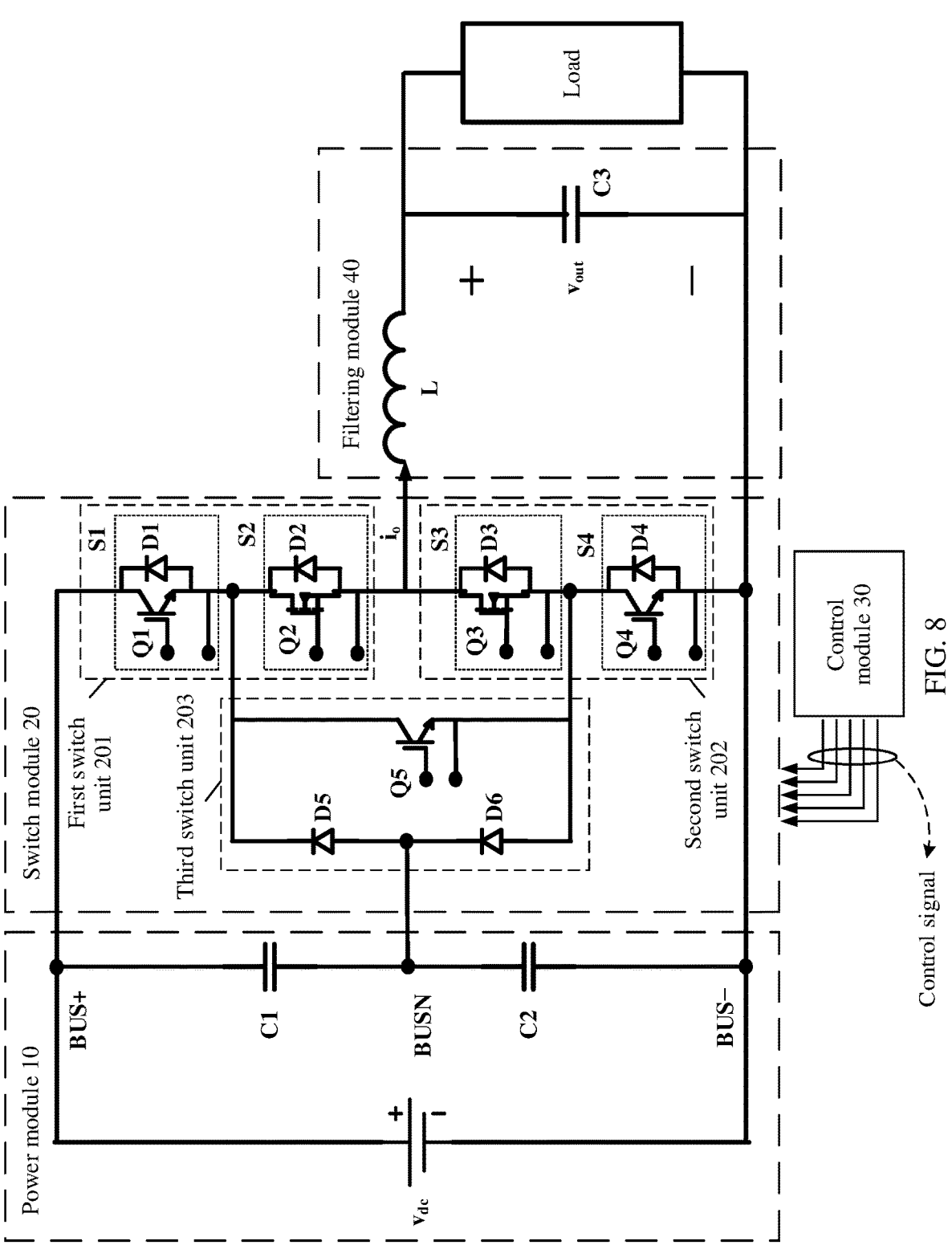
FIG. 8 is another schematic circuit diagram of a neutral point clamped inverter.

FIG. 8 is another schematic circuit diagram of a neutral point clamped inverter. As shown in FIG. 8, in some feasible implementations, the second switch S1, the fourth switch S3, and the first switch Q5 may be IGBTs, and the third switch S2 and the fourth switch S3 may be MOSFETs. It may be understood that the first electrode of each of the second switch S1, the fourth switch S3, and the first switch Q5 is a collector of each of the second switch S1, the fourth switch S3, and the first switch Q5, the second electrode of each of the second switch S1, the fourth switch S3, and the first switch Q5 is an emitter of each of the second switch S1, the fourth switch S3, and the first switch Q5, and the third electrode of each of the second switch S1, the fourth switch S3, and the first switch Q5 is a base of each of the second switch S1, the fourth switch S3, and the first switch Q5. The first electrodes of the third switch S2 and the fourth switch S3 are drains of the third switch S2 and the fourth switch S3, the second electrodes of the third switch S2 and the fourth switch S3 are sources of the third switch S2 and the fourth switch S3, and the third electrodes of the third switch S2 and the fourth switch S3 are gates of the third switch S2 and the fourth switch S3.

Figure 9:
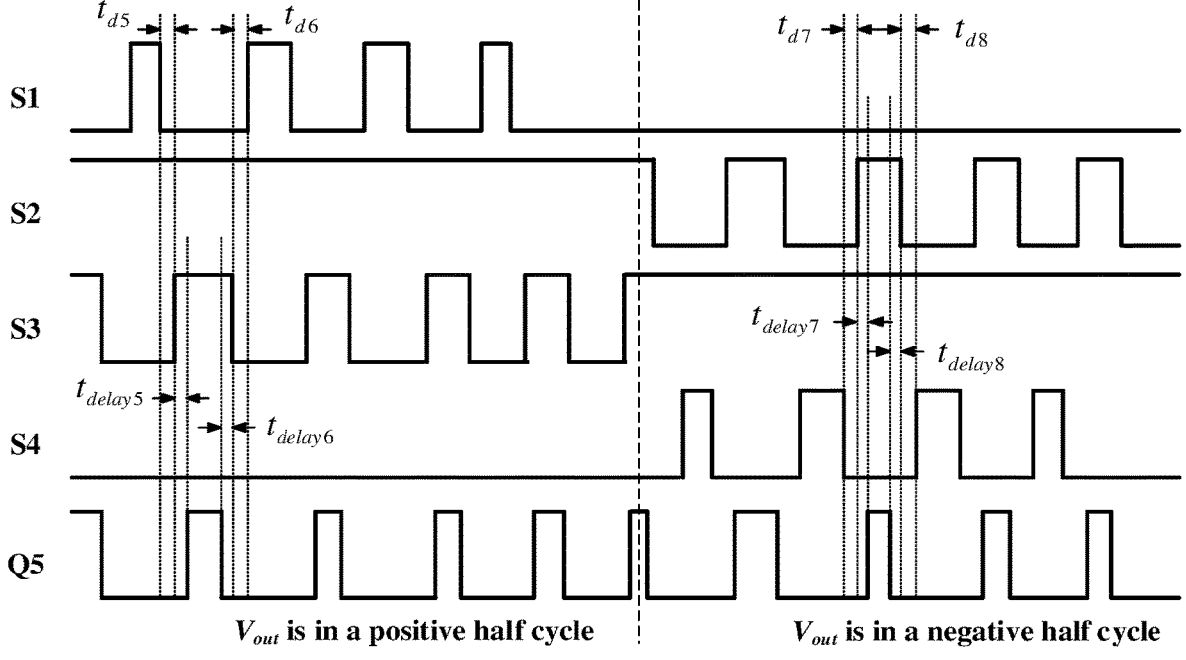
FIG. 9 is another schematic diagram of a switching time sequence of a neutral point clamped inverter.

As shown in FIG. 8, the control module 30 may generate a control signal used to control the first switch Q5, the second switch S1, the third switch S2, the fourth switch S3, and the fifth switch S4. The control signal herein may be used to control the second switch S1, the third switch S2, the fourth switch S3, the fifth switch S4, and the first switch Q5 to be turned on or turned off. FIG. 9 is another schematic diagram of a switching time sequence of a neutral point clamped inverter. As shown in FIG. 9, when the output voltage $V_{out}$ of the neutral point clamped inverter is in a positive half cycle, the third switch S2 remains in an on state, and the fifth switch S4 remains in an off state. The second switch S1, the fourth switch S3, and the first switch Q5 may work in a PWM mode, and the second switch S1 and the fourth switch S3 may be complementary switches. For the second switch S1 and the fourth switch S3 that are used as complementary switches, to prevent the second switch S1 and the fourth switch S3 from being simultaneously turned on, a dead time, for example, $t_{d5}$ or $t_{d6}$, needs to be added between the second switch S1 and the fourth switch S3. Herein, $t_{d5}$ may be a dead time between a moment at which the second switch S1 is turned off and a moment at which the fourth switch S3 is turned on, and $t_{d6}$ may be a dead time between a moment at which the fourth switch S3 is turned off and a moment at which the second switch S1 is turned on. When the output voltage $V_{out}$ of the neutral point clamped inverter is in a negative half cycle, the fourth switch S3 remains in an on state, and the second switch S1 remains in an off state. The third switch S2, the fifth switch S4, and the first switch Q5 work in a PWM mode, and the third switch S2 and the fifth switch S4 are complementary switches. For the third switch S2 and the fifth switch S4 that are used as complementary switches, to prevent the third switch S2 and the fifth switch S4 from being simultaneously turned on, a dead time, for example, $t_{d7}$ or $t_{d8}$, needs to be added between the third switch S2 and the fifth switch S4. Herein, $t_{d7}$ may be a dead time between a moment at which the fifth switch S4 is turned off and a moment at which the third switch S2 is turned on, and $t_{d8}$ may be a dead time between a moment at which the third switch S2 is turned off and a moment at which the fifth switch S4 is turned on.

In some feasible implementations, if the second switch S1, the fourth switch S3, and the first switch Q5 are IGBTs, and the third switch S2 and the fourth switch S3 are MOSFETs, when the output voltage $V_{out}$ of the neutral point clamped inverter is in the positive half cycle, the control module 30 may control the fourth switch S3 to be turned on, control, after a first preset delay time (for example, a preset delay time $t_{delay5}$), the first switch Q5 to be turned on, and control, after a second preset delay time (for example, a preset delay time $t_{delay6}$) existing after the first switch Q5 is controlled to be turned off, the fourth switch S3 to be turned off; or when the output voltage $V_{out}$ of the neutral point clamped inverter is in the negative half cycle, the control module 30 may control the third switch S2 to be turned on, control, after a third preset delay time (for example, a preset delay time $t_{delay7}$), the first switch Q5 to be turned on, and control, after a fourth preset delay time (for example, a preset delay time $t_{delay8}$) existing after the first switch Q5 is controlled to be turned off, the third switch S2 to be turned off.

Figures 10A, 10B:
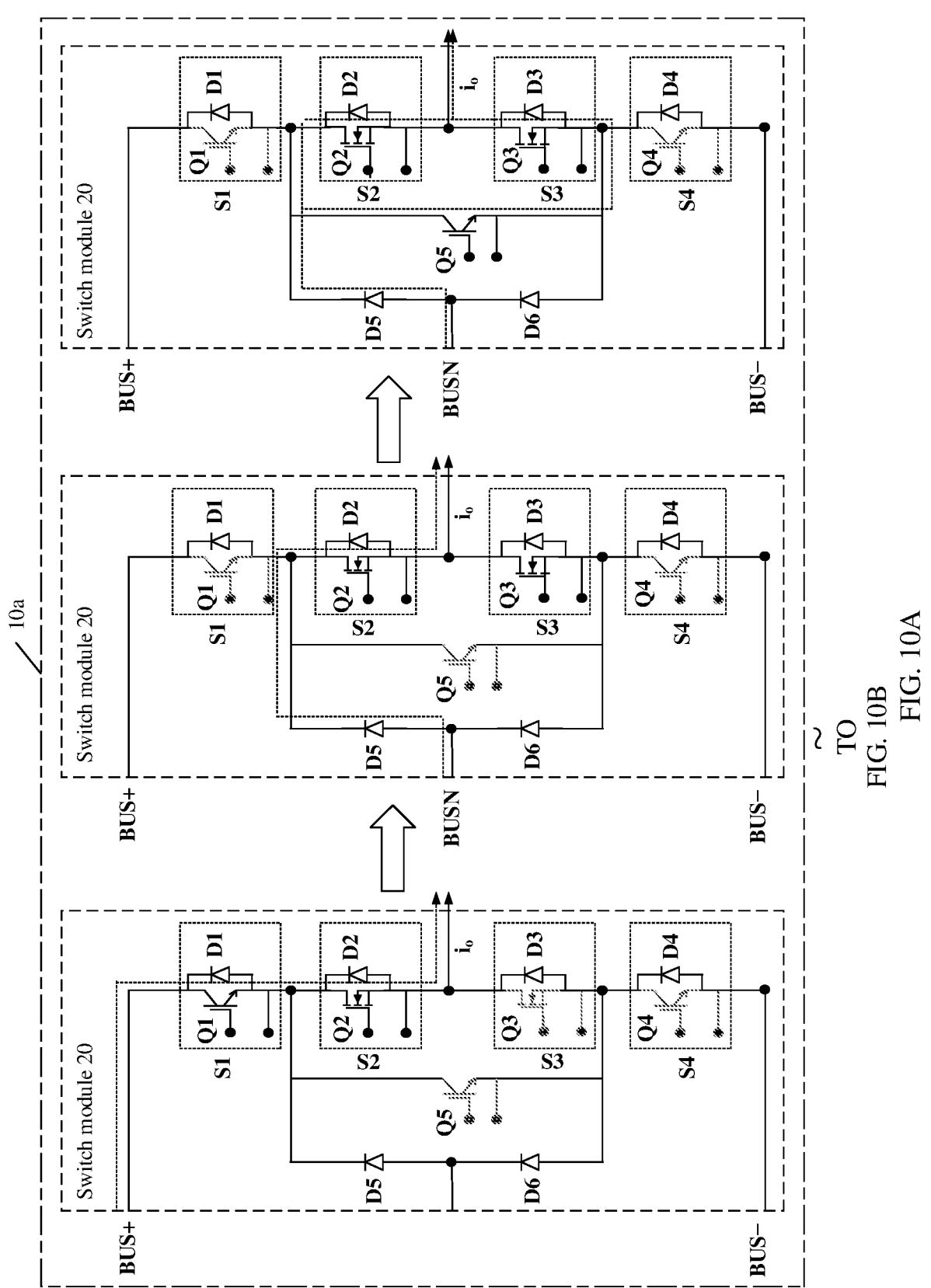
FIG. 10A and FIG. 10B are another schematic diagram of a commutation loop existing when a neutral point clamped inverter outputs active power.
Figure 10B:
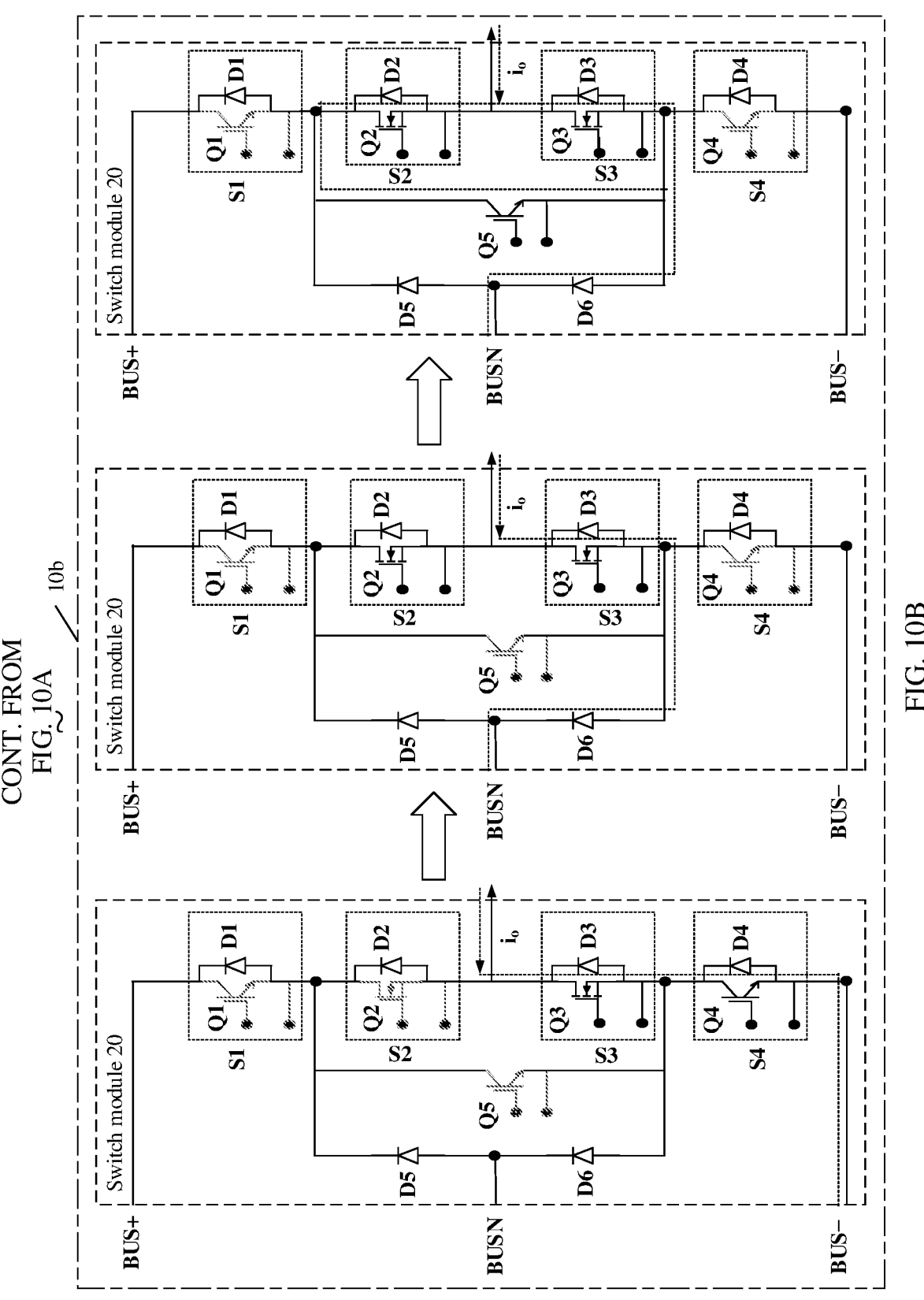

For ease of description, with reference to FIG. 10A, FIG. 10B, FIG. 11A, and FIG. 11B, a working principle of the switch module in the neutral point clamped inverter is described below by using an example. FIG. 10A and FIG. 10B are another schematic diagram of a commutation loop existing when a neutral point clamped inverter outputs active power. As shown in FIG. 10A and FIG. 10B, when the output voltage $V_{out}$ of the neutral point clamped inverter is in the positive half cycle and the load current $i_0$ is greater than 0, the neutral point clamped inverter outputs active power to the load, in other words, the neutral point clamped inverter runs in a working condition in which active power is output. In this working condition, the second switch S1, the fourth switch S3, and the first switch Q5 work in the PWM mode. In this case, a commutation loop existing when the switches are in different switching states may be shown in 10a in FIG. 10A and FIG. 10B. When the switching device Q1 is turned on, the current flows through the switching device Q1 and the switching device Q2. When the switching device Q1 is cut off and the switching device Q3 is turned on, the current flows through the first diode D5 and the switching device Q2. After the preset delay time $t_{delay5}$, the first switch Q5 is turned on. In this case, there are two current paths: a current path that flows through the first diode D5, the switching device Q2, and the first diode D5 and a current path that flows through the first switch Q5 and the freewheeling diode D3. In this way, a conduction loss can be reduced by using the two current paths that are turned on in parallel. It may be understood that the switching device Q1 and the first diode D5 participate in commutation, and generate a switching loss; the switching device Q2 is always turned on, and generates a conduction loss, and it may be further understood that the third switch S2 generates a conduction loss; and the first switch Q5 generates only a conduction loss, and the freewheeling diode D3 generates a conduction loss and a reverse recovery loss.

When the output voltage $V_{out}$ of the neutral point clamped inverter is in the negative half cycle and the load current $i_0$ is less than 0, the neutral point clamped inverter outputs active power to the load, in other words, the neutral point clamped inverter runs in a working condition in which active power is output. In this working condition, the third switch S2, the fifth switch S4, and the first switch Q5 work in the PWM mode. In this case, a commutation loop existing when the switches are in different switching states may be shown in 10b in FIG. 10A and FIG. 10B. When the switching device Q4 is turned on, the current flows through the switching device Q3 and the switching device Q4. When the switching device Q4 is cut off and the switching device Q2 is turned on, the current flows through the switching device Q3 and the second diode D6. After the preset delay time $t_{delay7}$, the first switch Q5 is turned on. In this case, there are two current paths: a current path that flows through the switching device Q3, the second diode D6, and the freewheeling diode D2 and a current path that flows through the first switch Q5 and the second diode D6. In this way, a conduction loss can be reduced by using the two current paths that are turned on in parallel. It may be understood that the switching device Q4 and the second diode D6 participate in commutation, and generate a switching loss; the switching device Q3 is always turned on, and generates a conduction loss, and it may be further understood that the fourth switch S3 generates a conduction loss; and the first switch Q5 generates a conduction loss, and the freewheeling diode D2 generates a conduction loss and a reverse recovery loss.

Figures 11A, 11B:
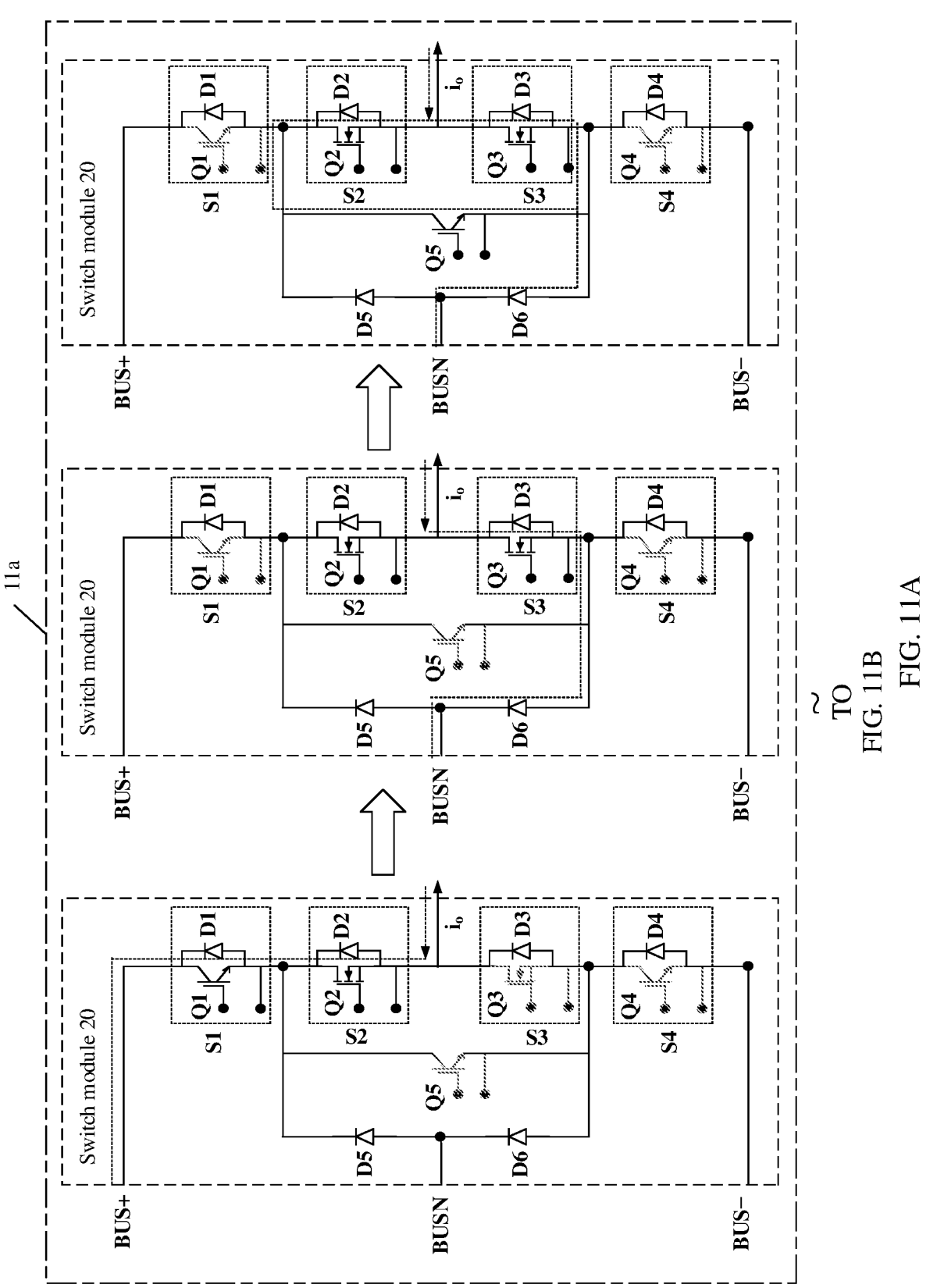
FIG. 11A and FIG. 11B are another schematic diagram of a commutation loop existing when a neutral point clamped inverter outputs reactive power.
Figure 11B:
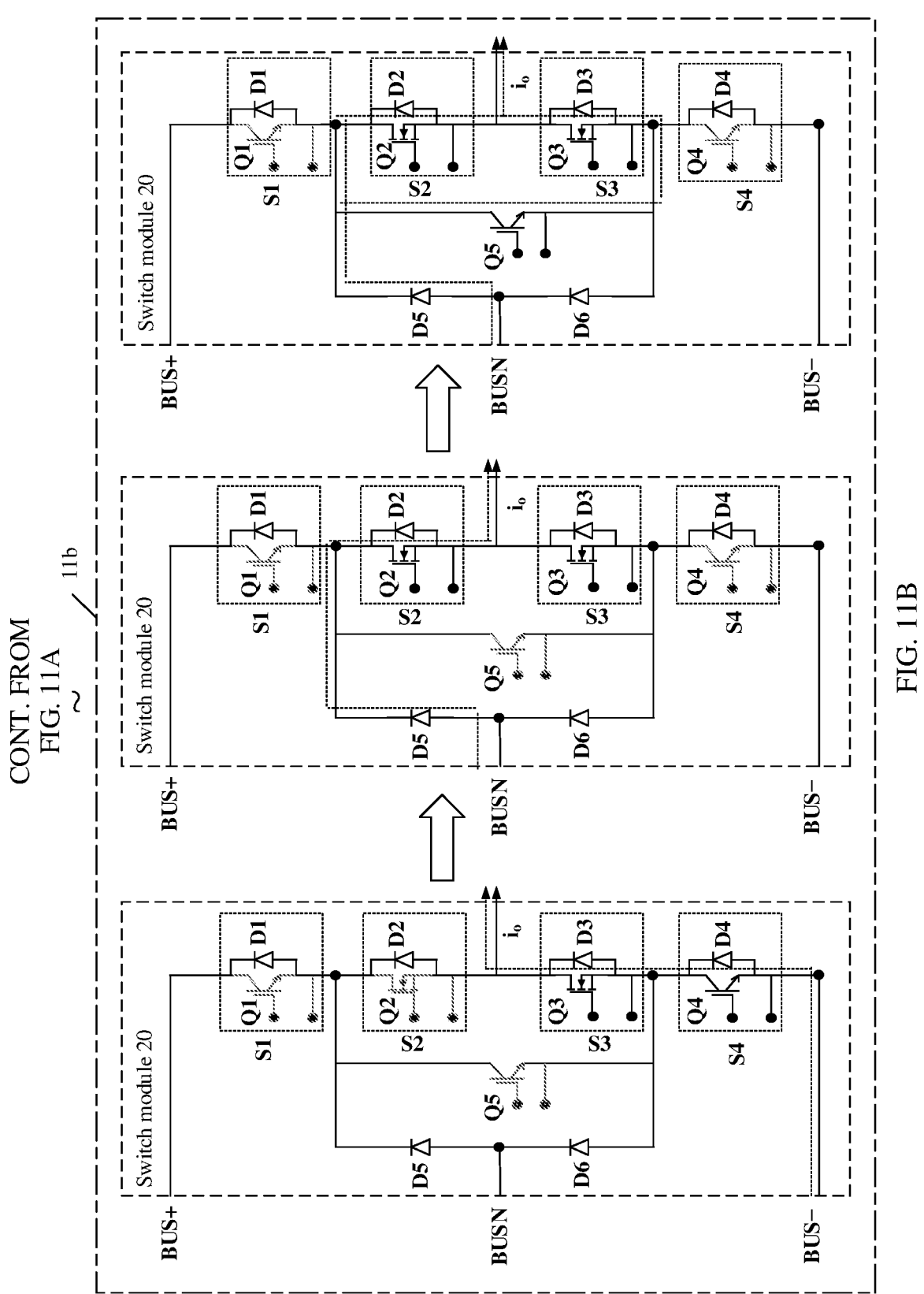

FIG. 11A and FIG. 11B are another schematic diagram of a commutation loop existing when a neutral point clamped inverter outputs reactive power. As shown in FIG. 11A and FIG. 11B, when the output voltage $V_{out}$ of the neutral point clamped inverter is in the positive half cycle and the load current $i_0$ is less than 0, the neutral point clamped inverter outputs reactive power to the load, in other words, the neutral point clamped inverter runs in a working condition in which reactive power is output. In this working condition, the second switch S1, the fourth switch S3, and the first switch Q5 work in the PWM mode. In this case, a commutation loop existing when the switches are in different switching states may be shown in 11a in FIG. 11A and FIG. 11B. When the switching device Q1 is turned on, the current flows through the freewheeling diode D2 and the freewheeling diode D1. When the switching device Q1 is cut off and the switching device Q3 is turned on, the current flows through the switching device Q3 and the second diode D6. After the preset delay time $t_{delay5}$, the first switch Q5 is turned on. In this case, there are two current paths: a current path that flows through the freewheeling diode D2, the first switch Q5, and the second diode D6 and a current path that flows through the switching device Q3 and the second diode D6. In this way, a conduction loss can be reduced by using the two current paths that are turned on in parallel. It may be understood that the switching device Q3 and the freewheeling diode D1 participate in commutation, and generate a switching loss, and it may be further understood that the fourth switch S3 generates a switching loss; the freewheeling diode D2 and the second diode D6 generate a conduction loss; and the first switch Q5 is in a zero-voltage switching state, has no switching loss, and generates a conduction loss.

When the output voltage $V_{out}$ of the neutral point clamped inverter is in the negative half cycle and the load current $i_0$ is greater than 0, the neutral point clamped inverter outputs reactive power to the load, in other words, the neutral point clamped inverter runs in a working condition in which reactive power is output. In this working condition, the third switch S2, the fifth switch S4, and the first switch Q5 work in the PWM mode. In this case, a commutation loop existing when the switches are in different switching states may be shown in 11b in FIG. 11A and FIG. 11B. When the switching device Q4 is turned on, the current flows through the freewheeling diode D4 and the freewheeling diode D3. When the switching device Q4 is cut off and the switching device Q2 is turned on, the current flows through the first diode D5 and the switching device Q2. After the preset delay time $t_{delay7}$, the first switch Q5 is turned on. In this case, there are two current paths: a current path that flows through the first diode D5, the first switch Q5, and the freewheeling diode D3 and a current path that flows through the first diode D5 and the switching device Q2. In this way, a conduction loss can be reduced by using the two current paths that are turned on in parallel. It may be understood that the switching device Q2 and the freewheeling diode D4 participate in commutation, and generate a switching loss, and it may be further understood that the third switch S2 generates a switching loss; the freewheeling diode D3 and the first diode D5 generate a conduction loss; and the first switch Q5 is in a zero-voltage switching state, has no switching loss, and generates a conduction loss.

With reference to the description of the embodiments in FIG. 10A, FIG. 10B, FIG. 11A, and FIG. 11B, it may be understood that when the neutral point clamped inverter outputs active power to the load, the control module 30 may control each switch to be turned on or turned off, so that the third switch S2, the fourth switch S3, and the first switch Q5 are selected to reduce the conduction loss based on the current paths that are turned on in parallel, or when the neutral point clamped inverter outputs reactive power to the load, the control module 30 may control each switch to be turned on or turned off, so that the first switch Q5 is selected to bear the conduction loss, and the third switch S2 or the fourth switch S3 may be selected to bear the switching loss existing when reactive power is output. The third switch S2 and the fourth switch S3 are switching devices with a low switching loss, and the first switch Q5 is a switching device with a low conduction loss. Therefore, the third switch S2 and the fourth switch S3 with a low switching loss may be used to bear the switching loss, and the first switch Q5 with a low conduction loss is used to bear the conduction loss, to reduce running losses of the inverter in all working conditions, improve running efficiency of the inverter, and achieve higher applicability.

Figure 12:
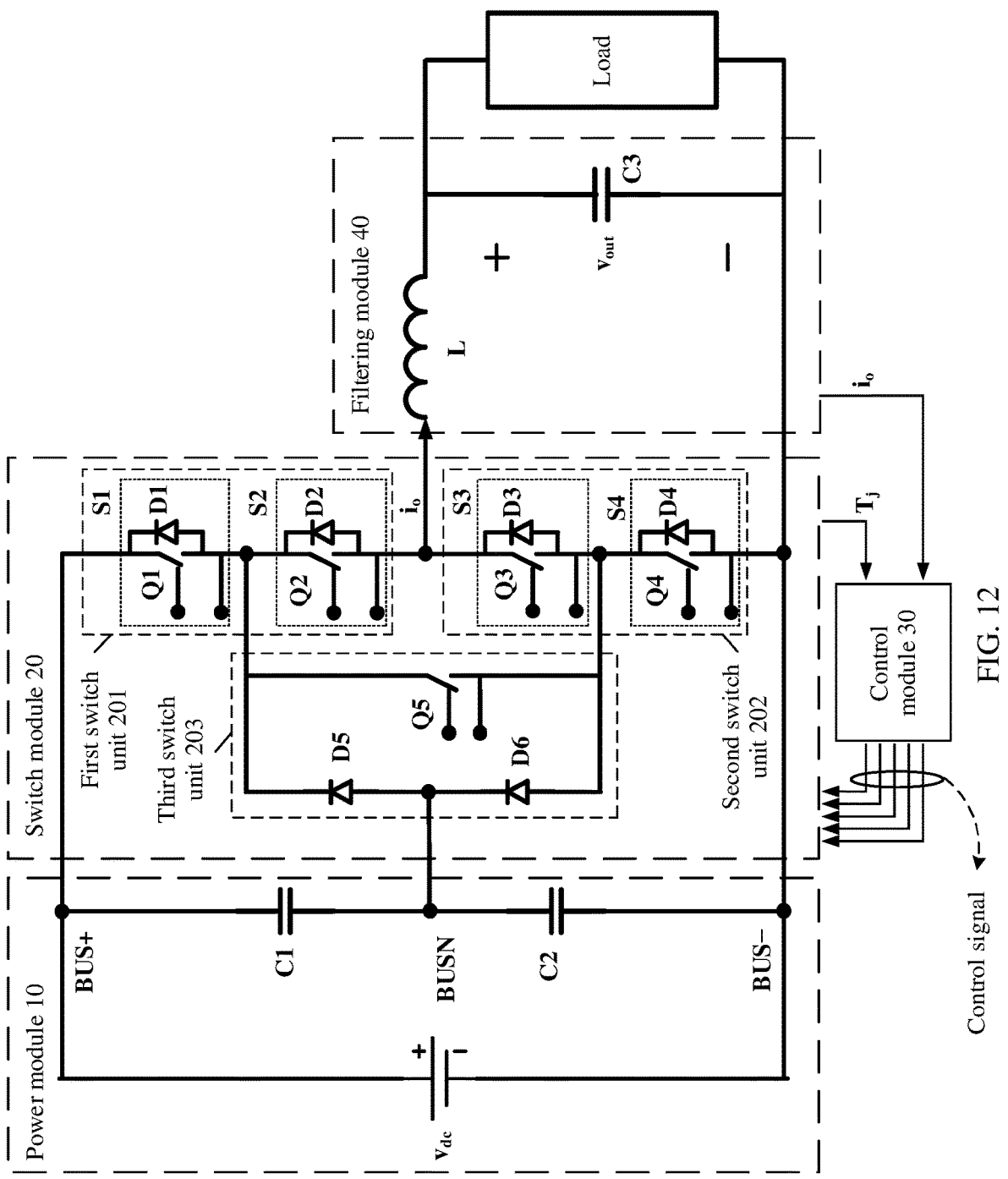
FIG. 12 is still another schematic circuit diagram of a neutral point clamped inverter.

FIG. 12 is still another schematic circuit diagram of a neutral point clamped inverter. As shown in FIG. 12, in some feasible implementations, the second switch S1, the third switch S2, the fourth switch S3, the fifth switch S4, and the first switch Q5 may be controllable power switching devices, for example, IGBTs or MOSFETs. When the output voltage $V_{out}$ of the neutral point clamped inverter is in a positive half cycle, the third switch S2 remains in an on state, and the fifth switch S4 remains in an off state. The second switch S1, the fourth switch S3, and the first switch Q5 may work in a PWM mode, and the second switch S1 and the fourth switch S3 may be complementary switches. When the output voltage $V_{out}$ of the neutral point clamped inverter is in a negative half cycle, the fourth switch S3 remains in an on state, and the second switch S1 remains in an off state. The third switch S2, the fifth switch S4, and the first switch Q5 work in a PWM mode, and the third switch S2 and the fifth switch S4 are complementary switches.

In some feasible implementations, the control module 30 may further determine the first preset delay time, the second preset delay time, the third preset delay time, and the fourth preset delay time based on a device junction temperature corresponding to each of the first switch Q5, the second switch S1, the third switch S2, the fourth switch S3, and the fifth switch S4 and/or the load current $i_0$ flowing through the load. A device junction temperature of a switch j in the second switch S1, the third switch S2, the fourth switch S3, the fifth switch S4, and the first switch Q5 may be represented as $T_j$, where j is a positive integer greater than 0 and less than or equal to a quantity (for example, 5) of switches in the switch module 20. If the first preset delay time is the preset delay time $t_{delay}$, the second preset delay time is the preset delay time $t_{delay2}$, the third preset delay time is the preset delay time $t_{delay3}$, and the fourth preset delay time is the preset delay time $t_{delay4}$, a schematic diagram of a switching time sequence of the neutral point clamped inverter may be shown in FIG. 5, and a schematic diagram of a commutation loop of the neutral point clamped inverter may be shown in FIG. 6A, FIG. 6B, FIG. 7A, and FIG. 7B. If the first preset delay time is the preset delay time $t_{delay5}$, the second preset delay time is the preset delay time $t_{delay6}$, the third preset delay time is the preset delay time $t_{delay7}$, and the fourth preset delay time is the preset delay time $t_{delay8}$, a schematic diagram of a switching time sequence of the neutral point clamped inverter may be shown in FIG. 9, and a schematic diagram of a commutation loop of the neutral point clamped inverter may be shown in FIG. 10A, FIG. 10B, FIG. 11A, and FIG. 11B. In implementation, for more operations performed by the neutral point clamped inverter, refer to the implementations performed by the neutral point clamped inverter shown in FIG. 2 to FIG. 11A and FIG. 11B and the neutral point clamped inverter in the working principle of the neutral point clamped inverter. Details are not described herein. It may be understood that the control module may adjust the first preset delay time, the second preset delay time, the third preset delay time, and the fourth preset delay time based on the device junction temperature $T_j$ of the switch j and the load current $i_0$, to implement adaptive control of the inverter based on a working condition, so as to reduce losses of the inverter in all working conditions, improve running efficiency of the inverter, and achieve higher flexibility and higher applicability.

It should be noted that the neutral point clamped inverter may be further used in a single-phase inverter circuit, a three-level circuit, a rectifier circuit, or a three-phase circuit, or may be further used in a circuit that is based on a circuit of the neutral point clamped inverter and in which a circuit level quantity is increased or power devices are connected in series or in parallel by using a multi-level technology. This may be determined based on an actual application scenario and is not limited herein.

In the neutral point clamped inverter, different switch units may be flexibly selected, based on the control module, to bear switching losses or conduction losses in different working conditions (for example, working conditions in which active power is output or reactive power is output), to reduce losses of the inverter in all working conditions, improve running efficiency of the inverter, and achieve higher flexibility and higher applicability.

The foregoing descriptions are merely implementations but are not intended as limiting. Any variation or replacement readily figured out by a person skilled in the art shall fall within the scope of the embodiments.

What is claimed is:

1. A neutral point clamped inverter comprising:
   a power module, wherein the power module comprises a power supply and a first capacitor and a second capacitor that are connected in series and then connected in parallel to two ends of the power supply;
   a switch module, wherein the switch module comprises a first switch unit, a second switch unit, and a third switch unit, a first connection end of the first switch unit is connected to a positive electrode of the power supply, a second connection end of the first switch unit is connected to a first connection end of the third switch unit, a third connection end of the first switch unit is connected to a first connection end of the second switch unit and a load, a second connection end of the second switch unit is connected to a second connection end of the third switch unit, a third connection end of the second switch unit is connected to a negative electrode of the power supply and the load, and a third connection end of the third switch unit is connected to the first capacitor and the second capacitor, wherein at least one of the first switch unit, the second switch unit, and the third switch unit is in a group of one or more low switching loss switches and wherein at least one other of the first switch unit, the second switch unit, and the third switch unit is in a group of one or more low conduction loss switches; and a control module, wherein the control module is separately connected to the first switch unit, the second switch unit, and the third switch unit, and the control module is configured to control each of the first switch unit, the second switch unit, and the third switch unit to be turned on or turned off, so that different switch units in the switch module are selected to bear a conduction loss or a switching loss;

wherein the control module is configured to, upon detection that active power is output to the load, select at least one low conduction loss switch in the one or more low conduction loss switches to bear the conduction loss and is configured to, upon detection that reactive power is output to the load, select at least one low switching loss switch in the one or more low switching loss switches to bear the switching loss.

2. The neutral point clamped inverter according to claim 1, wherein the neutral point clamped inverter further comprises a filtering module; and the filtering module comprises an inductor and a third capacitor, one end of the inductor is separately connected to the third connection end of the first switch unit and the first connection end of the second switch unit, the other end of the inductor is separately connected to one end of the third capacitor and the load, and the other end of the third capacitor is connected to the second connection end of the second switch unit and the load.

3. The neutral point clamped inverter according to claim 1, wherein the third switch unit comprises a first switch, a first diode, and a second diode; and a cathode of the first diode and a first electrode of the first switch are connected to serve as the first connection end of the third switch unit, an anode of the second diode and a second electrode of the first switch are connected to serve as the second connection end of the third switch unit, and an anode of the first diode and a cathode of the second diode are connected to serve as the third connection end of the third switch unit.

4. The neutral point clamped inverter according to claim 3, wherein the first switch unit comprises a second switch and a third switch, the second switch unit comprises a fourth switch and a fifth switch, a first electrode of the second switch serves as the first connection end of the first switch unit, a second electrode of the second switch and a first electrode of the third switch are connected to serves as the second connection end of the first switch unit, a second electrode of the third switch serves as the third connection end of the first switch unit, a first electrode of the fourth switch serves as the first connection end of the second switch unit, a second electrode of the fourth switch and a first electrode of the fifth switch are connected to serve as the second connection end of the second switch unit, and a second electrode of the fifth switch serves as the third connection end of the second switch unit; and the control module is separately connected to third electrodes of all of the first switch, the second switch, the third switch, the fourth switch, and the fifth switch.

5. The neutral point clamped inverter according to claim 4, wherein the control module is configured to control each of the first switch, the second switch, the third switch, the fourth switch, and the fifth switch to be turned on or turned off, so that the first switch, the third switch, and the fourth switch are selected to bear the conduction loss based on current paths that are turned on in parallel, or the first switch is selected to bear the switching loss, and the third switch or the fourth switch is selected to bear the conduction loss, or the first switch is selected to bear the conduction loss, and the third switch or the fourth switch is selected to bear the switching loss.

6. The neutral point clamped inverter according to claim 4, wherein the first switch, the second switch, the third switch, the fourth switch, or the fifth switch is an insulated gate bipolar transistor (IGBT) or a metal-oxide-semiconductor field-effect transistor (MOSFET).

7. The neutral point clamped inverter according to claim 6, wherein the first switch, the second switch, the third switch, the fourth switch, or the fifth switch is made of a silicon (Si) semiconductor material or a third generation wide-bandgap semiconductor material silicon carbide (SiC) or gallium nitride (GaN).

8. The neutral point clamped inverter according to claim 4, wherein the first switch is a MOSFET, and the second switch, the third switch, the fourth switch, and the fifth switch are IGBTs; and the first electrode, the second electrode, and the third electrode of the first switch are respectively a drain, a source, and a gate of the first switch, and in the second switch, the third switch, the fourth switch, and the fifth switch, the first electrode of each switch is a collector of each switch, the second electrode of each switch is an emitter of each switch, and the third electrode of each switch is a base of each switch.

9. The neutral point clamped inverter according to claim 4, wherein the first switch, the second switch, and the fifth switch are IGBTs, and the third switch and the fourth switch are MOSFETs; and in the first switch, the second switch, and the fifth switch, the first electrode of each switch is a collector of each switch, the second electrode of each switch is an emitter of each switch, and the third electrode of each switch is a base of each switch, the first electrodes of the third switch and the fourth switch are drains of the third switch and the fourth switch, the second electrodes of the third switch and the fourth switch are sources of the third switch and the fourth switch, and the third electrodes of the third switch and the fourth switch are gates of the third switch and the fourth switch.

10. The neutral point clamped inverter according to claim 4, wherein the control module is further configured to generate a control signal used to control each of the first switch, the second switch, the third switch, the fourth switch, and the fifth switch, wherein the control signal is used to control each switch to be turned on or turned off.

11. The neutral point clamped inverter according to claim 10, wherein the control module is configured to:

control the first switch to be turned on, control, after a first preset delay time, the fourth switch to be turned on, and control, after a second preset delay time existing after the fourth switch is controlled to be turned off, the first switch to be turned off; or control the first switch to be turned on, control, after a third preset delay time, the third switch to be turned on, and control, after a fourth preset delay time existing after the third switch is controlled to be turned off, the first switch to be turned off.

12. The neutral point clamped inverter according to claim 10, wherein the control module is configured to:

control the fourth switch to be turned on, control, after a first preset delay time, the first switch to be turned on, and control, after a second preset delay time existing after the first switch is controlled to be turned off, the fourth switch to be turned off; or control the third switch to be turned on, control, after a third preset delay time, the first switch to be turned on, and control, after a fourth preset delay time existing after the first switch is controlled to be turned off, the third switch to be turned off.

13. The neutral point clamped inverter according to claim 11, wherein the control module is further configured to determine the first preset delay time, the second preset delay time, the third preset delay time, and the fourth preset delay time based on a device junction temperature corresponding to each of the first switch, the second switch, the third switch, the fourth switch, and the fifth switch and/or a load current flowing through the load.

14. A photovoltaic power supply system, comprising:

a photovoltaic array and an inverter connected to the photovoltaic array, wherein the inverter comprises a power module, wherein the power module comprises a power supply and a first capacitor and a second capacitor that are connected in series and then connected in parallel to two ends of the power supply;

a switch module, wherein the switch module comprises a first switch unit, a second switch unit, and a third switch unit, a first connection end of the first switch unit is connected to a positive electrode of the power supply, a second connection end of the first switch unit is connected to a first connection end of the third switch unit, a third connection end of the first switch unit is connected to a first connection end of the second switch unit and a load, a second connection end of the second switch unit is connected to a second connection end of the third switch unit, a third connection end of the second switch unit is connected to a negative electrode of the power supply and the load, and a third connection end of the third switch unit is connected to the first capacitor and the second capacitor, wherein at least one of the first switch unit, the second switch unit, and the third switch unit is in a group of one or more low switching loss switches and wherein at least one other of the first switch unit, the second switch unit, and the third switch unit is in a group of one or more low conduction loss switches; and a control module, wherein the control module is separately connected to the first switch unit, the second switch unit, and the third switch unit, and the control module is configured to control each of the first switch unit, the second switch unit, and the third switch unit to be turned on or turned off, so that different switch units in the switch module are selected to bear a conduction loss or a switching loss; wherein the control module is configured to, upon detection that active power is output to the load, select at least one low conduction loss switch in the one or more low conduction loss switches to bear the conduction loss and is configured to, upon detection that reactive power is output to the load, select at least one low switching loss switch in the one or more low switching loss switches to bear the switching loss.

15. The photovoltaic power supply system according to claim 14, wherein the neutral point clamped inverter further comprises a filtering module; and the filtering module comprises an inductor and a third capacitor, one end of the inductor is separately connected to the third connection end of the first switch unit and the first connection end of the second switch unit, the other end of the inductor is separately connected to one end of the third capacitor and the load, and the other end of the third capacitor is connected to the second connection end of the second switch unit and the load.

16. The photovoltaic power supply system according to claim 14, wherein the third switch unit comprises a first switch, a first diode, and a second diode; and a cathode of the first diode and a first electrode of the first switch are connected to serve as the first connection end of the third switch unit, an anode of the second diode and a second electrode of the first switch are connected to serve as the second connection end of the third switch unit, and an anode of the first diode and a cathode of the second diode are connected to serve as the third connection end of the third switch unit.

17. The photovoltaic power supply system according to claim 16, wherein the first switch unit comprises a second switch and a third switch, the second switch unit comprises a fourth switch and a fifth switch, a first electrode of the second switch serves as the first connection end of the first switch unit, a second electrode of the second switch and a first electrode of the third switch are connected to serves as the second connection end of the first switch unit, a second electrode of the third switch serves as the third connection end of the first switch unit, a first electrode of the fourth switch serves as the first connection end of the second switch unit, a second electrode of the fourth switch and a first electrode of the fifth switch are connected to serve as the second connection end of the second switch unit, and a second electrode of the fifth switch serves as the third connection end of the second switch unit; and the control module is separately connected to third electrodes of all of the first switch, the second switch, the third switch, the fourth switch, and the fifth switch.

18. The photovoltaic power supply system according to claim 16, wherein the control module is configured to control each of the first switch, the second switch, the third switch, the fourth switch, and the fifth switch to be turned on or turned off, so that the first switch, the third switch, and the fourth switch are selected to bear the conduction loss based on current paths that are turned on in parallel, or the first switch is selected to bear the switching loss, and the third switch or the fourth switch is selected to bear the conduction loss, or the first switch is selected to bear the conduction loss, and the third switch or the fourth switch is selected to bear the switching loss.

19. The photovoltaic power supply system according to claim 16, wherein the first switch, the second switch, the third switch, the fourth switch, or the fifth switch is an insulated gate bipolar transistor IGBT or a metal-oxide-semiconductor field-effect transistor MOSFET.

* * * * *